United States Patent
Liang

(10) Patent No.: US 9,280,460 B2
(45) Date of Patent: Mar. 8, 2016

(54) DATA WRITING METHOD, MEMORY CONTROL CIRCUIT UNIT AND MEMORY STORAGE APPARATUS

(71) Applicant: PHISON ELECTRONICS CORP., Miaoli (TW)

(72) Inventor: Ming-Jen Liang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 79 days.

(21) Appl. No.: 14/226,768

(22) Filed: Mar. 26, 2014

(65) Prior Publication Data

US 2015/0193340 A1 Jul. 9, 2015

(30) Foreign Application Priority Data

Jan. 9, 2014 (TW) .............................. 103100746 A

(51) Int. Cl.
*G06F 12/00* (2006.01)
*G06F 12/02* (2006.01)
*G06F 3/06* (2006.01)

(52) U.S. Cl.
CPC .......... *G06F 12/0246* (2013.01); *G06F 3/0604* (2013.01); *G06F 3/0652* (2013.01); *G06F 3/0659* (2013.01); *G06F 3/0679* (2013.01); *G06F 2003/0697* (2013.01); *G06F 2212/7205* (2013.01)

(58) Field of Classification Search
CPC . G06F 12/0246; G06F 3/0604; G06F 3/0652; G06F 3/0679; G06F 3/0659

USPC .................. 711/103, 112, 114, 170, 162, 165
See application file for complete search history.

(56) References Cited

U.S. PATENT DOCUMENTS

| 6,662,309 B2 * | 12/2003 | Ando et al. .................... 711/112 |
| 8,762,658 B2 * | 6/2014 | Flynn et al. .................... 711/154 |
| 8,856,475 B1 * | 10/2014 | Meir et al. ..................... 711/165 |
| 2008/0082736 A1 * | 4/2008 | Chow et al. .................... 711/103 |
| 2012/0005405 A1 * | 1/2012 | Wu et al. ....................... 711/103 |

OTHER PUBLICATIONS

Han et al., "An Intelligent Garbage Collection Algorithm for Flash Memory Storages", Computational Science and Its Applications—ICCSA 2006, vol. 3980/2006, pp. 1019-1027, Springer Berlin / Heidelberg, Germany, May 11, 2006.*
Micron, "TN-29-42: Wear-Leveling Techniques in NAND Flash Devices," Mar. 10, 2010.*

* cited by examiner

*Primary Examiner* — Pierre-Michel Bataille
(74) *Attorney, Agent, or Firm* — Jianq Chyun IP Office

(57) ABSTRACT

A data writing method for a rewritable non-volatile memory module having a plurality of physical erasing units, and a memory control circuit unit and the memory storage apparatus are provided. The method includes grouping the physical erasing units into at least a data area, a backup area and a spare area; and setting a value obtained by summing a minimum threshold and a predetermined number as a garbage collecting threshold. The data writing method also includes getting at least one physical erasing unit from the spare area, writing data into the gotten physical erasing unit, associating the gotten physical erasing unit with the backup area and re-adjusting the garbage collecting threshold according to the number of physical erasing units associated with the backup area and the minimum threshold.

15 Claims, 22 Drawing Sheets

DATA WRITING METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 103100746, filed on Jan. 9, 2014. The entirety of the above-mentioned patent application is hereby incorporated by reference herein and made a part of this specification.

BACKGROUND

1. Technical Field

The present invention relates to a data writing method for a non-volatile memory module, and a memory control circuit unit and a memory storage apparatus using the same.

2. Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high read/write speed. A solid state drive (SSD) is a memory storage apparatus which utilizes a flash memory as its storage medium. For these reasons, the flash memory has become an important part of the electronic industries.

A flash memory storage module includes a plurality of physical erasing units each having a plurality of physical programming units, and when writing data into the physical erasing unit, data must be written according to a sequence of the physical programming units. In addition, the physical programming units already written with data must be erased before it can be used again for writing data. In particular, the physical erasing unit is served as a smallest unit for erasing, whereas the physical programming unit is served as a smallest unit for programming (or writing). Therefore, in a management of the flash memory module, the physical erasing units may be divided into a data area and a spare area.

The physical erasing units of the data area are used to store data stored by the host system. More specifically, a memory control circuit unit in the memory storage apparatus may convert logical access addresses to be accessed by the host system into logical pages of logical blocks, and map the logical pages of the logical blocks to the physical programming units of the physical erasing units of the data area. Namely, in the management of the flash memory module, the physical erasing units of the data area are regarded as the physical erasing units already being used (e.g., already stored with data written by the host system). For instance, the memory control circuit unit may use a logical-to-physical address mapping table to record a mapping relation between the logical blocks and the physical erasing units of the data area, in which the logical pages in the logical blocks are corresponding to the physical programming units of the physical erasing units being mapped.

The physical erasing units of the spare area are used to alternately exchange the physical erasing units in the data area. More specifically, as described above, the physical erasing units written with data must be erased before it can be used again for writing data. Therefore, the physical erasing units of the spare area are designed to write the data for alternately exchanging the physical erasing units mapped to the logical blocks. Accordingly, the physical erasing units of the spare area are empty or available physical erasing units (i.e., in which data are not recorded or data are marked as invalid data).

In other words, the physical programming units of the physical erasing units in the data area and the spare data are alternately exchanged for mapping to the logical pages of the logical blocks, so as to store the data written by the host system. For instance, in case the logical access address to be written with the data from the host system is corresponding to one specific logical page of one specific block, the memory control circuit unit of the memory storage apparatus may get one or more physical erasing units from the spare area, write the data into the physical programming units of the gotten physical erasing units, and associate the physical erasing unit written with the data with the data area.

Particularly, during operations of the memory storage apparatus, in case the spare area is about to run out of the physical erasing units, the memory control circuit unit of the memory storage apparatus may arrange valid data in at least one physical erasing unit of the data area to the physical programming units not being used in other physical erasing units of the data area (hereinafter, known as "a valid data merging operation"). Accordingly, an erasing operation may be performed on the physical erasing units only stored with the invalid data, and the erased physical erasing units may be associated with the spare area, so that a mechanism of alternately exchanges may be maintained to execute subsequent write commands.

However, execution of said data merging operation is quite time consuming. Therefore, in case the host system requests to write (or back up) a great amount of data within a short time period (e.g., a request instructing to write the data in a buffer memory into the rewritable non-volatile memory when power is about to go off) and the physical erasing units of the spare area are about to run out, it may consume a great amount of time for the memory control circuit unit of the memory storage apparatus to execute the data merging operation. As a result, the data may fail to be written within a predetermined time, and the data stored by the system may be lost.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data writing method, a memory control circuit unit and a memory storage apparatus, capable of quickly writing and recovering backup data.

Accordingly, a data writing method for a rewritable non-volatile memory module is provided according to an exemplary embodiment of the present invention, in which the rewritable non-volatile memory module has a plurality of physical erasing units. The data writing method includes: at least associating the physical erasing units with a data area, a backup area and a spare area; configuring a plurality of first logical units and a plurality of second logical units for accessing by a host system, and setting a value obtained by summing a minimum threshold and a predetermined number as a garbage collecting threshold, wherein the first logical units are mapped to the physical erasing units associated with the data area, and the second logical units are mapped to the physical erasing units associated with the backup area. The data writing method also includes receiving a first write command from the host system, wherein the first write command instructs to write first data into at least one logical unit among the second logical units. The data writing method also includes getting at least one first physical erasing unit from among the physical erasing units of the spare area, writing the first data into the first physical erasing unit, associating the first physical erasing unit with the backup area, and adjusting the garbage collecting threshold according to the number of the first physical erasing units and the minimum threshold, wherein the adjusted garbage collecting threshold is obtained by subtracting the number of the physical erasing units associated with the backup area among the physical erasing units from the value obtained by summing the minimum threshold and the predetermined number, and the number of the physical erasing units associated with the backup area among the physical erasing units is not greater than the predetermined number.

A memory control circuit unit for a rewritable non-volatile memory module is provided according to an exemplary embodiment of the invention, in which the rewritable non-volatile memory module has a plurality of physical erasing units. The memory control circuit unit includes a host interface, a memory interface and a memory management circuit. The host interface is configured to couple to a host system. The memory interface is used for coupling to the rewritable non-volatile memory module. The memory management circuit is coupled to the host interface and the memory interface. The memory management circuit is further configured to at least associate the physical erasing units with a data area, a backup area and a spare area, configure a plurality of first logical units and a plurality of second logical units for accessing by the host system. The first logical units are mapped to the physical erasing units associated with the data area, and the second logical units are mapped to the physical erasing units associated with the backup area. Herein, the memory management circuit is further configured to set a value obtained by summing a minimum threshold and a predetermined number as a garbage collecting threshold. In addition, the memory management circuit is further configured to receive a first write command from the host system, and the first write command instructs to write first data into at least one logical unit among the second logical units. Further, the memory management circuit is further configured to get at least one first physical erasing unit from among the physical erasing units of the spare area, write the first data into the first physical erasing unit, associate the first physical erasing unit with the backup area, and adjust the garbage collecting threshold according to the number of the first physical erasing units and the minimum threshold, wherein the adjusted garbage collecting threshold is obtained by subtracting the number of the physical erasing units associated with the backup area among the physical erasing units from the value obtained by summing the minimum threshold and the predetermined number, and the number of the physical erasing units associated with the backup area among the physical erasing units is not greater than the predetermined number.

A memory storage apparatus is provided according to an exemplary embodiment of the present invention, which includes a connection interface unit, a rewritable non-volatile memory module and a memory control circuit unit. The connection interface unit is configured to couple to a host system. The rewritable non-volatile memory module includes a plurality of physical erasing units. The memory control circuit unit is coupled to the connection interface unit and the rewritable non-volatile memory module. The memory control circuit unit is further configured to at least associate the physical erasing units with a data area, a backup area and a spare area, configure a plurality of first logical units and a plurality of second logical units for accessing by the host system. The first logical units are mapped to the physical erasing units associated with the data area, and the second logical units are mapped to the physical erasing units associated with the backup area. Herein, the memory control circuit unit is further configured to set a value obtained by summing a minimum threshold and a predetermined number as a garbage collecting threshold. In addition, the memory control circuit unit is further configured to receive a first write command from the host system, and the first write command instructs to write first data into at least one logical unit among the second logical units. Further, the memory control circuit unit is further configured to get at least one first physical erasing unit from among the physical erasing units of the spare area, write the first data into the first physical erasing unit, associate the first physical erasing unit with the backup area, and adjust the garbage collecting threshold according to a number of the first physical erasing units and the minimum threshold, wherein the adjusted garbage collecting threshold is obtained by subtracting the number of the physical erasing units associated with the backup area among the physical erasing units from the value obtained by summing the minimum threshold and the predetermined number, and the number of the physical erasing units associated with the backup area among the physical erasing units is not greater than the predetermined number.

Based on above, in the data writing method, the memory control circuit unit and the memory storage apparatus, the physical erasing units dedicating to write sequential data are dynamically reserved, so as to avoid execution of data merging operation for reducing time for writing a great amount of the sequential data.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
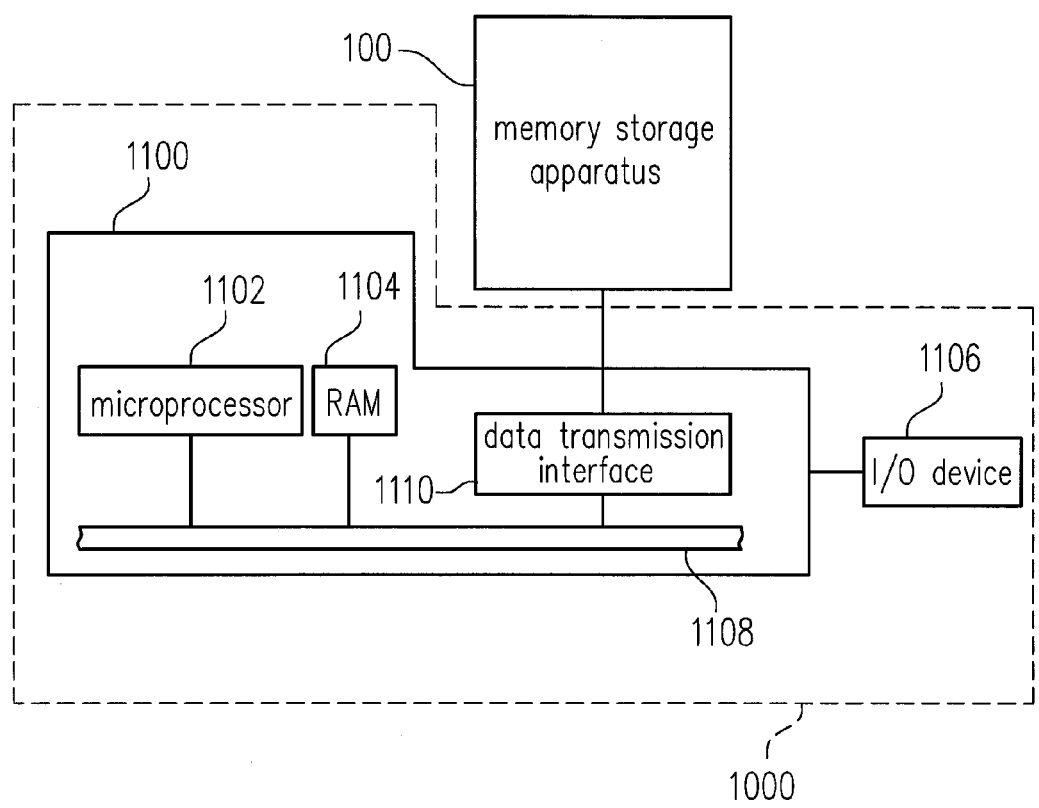
FIG. 1 illustrates a host system and a memory storage apparatus according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A,B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage apparatus (also known as a memory storage system) includes a rewritable non-volatile memory module and a controller (also known as a control circuit). The memory storage apparatus is usually configured together with a host system so that the host system may write data to or read data from the memory storage apparatus.

FIG. 1 illustrates a host system and a memory storage apparatus according to an exemplary embodiment.

Figure 2:
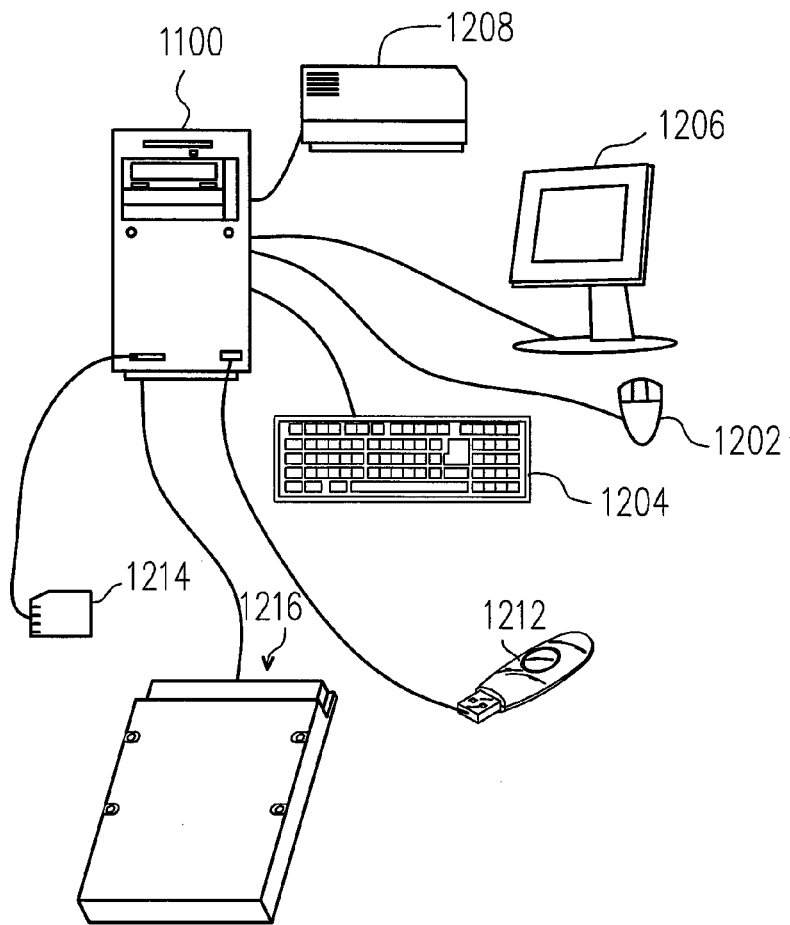
FIG. 2 is a schematic diagram of a computer, an input/output device, and a memory storage apparatus according to an exemplary embodiment.

Referring to FIG. 1, a host system 1000 includes a computer 1100 and an input/output (I/O) device 1106. The computer 1100 includes a microprocessor 1102, a random access memory (RAM) 1104, a system bus 1108, and a data transmission interface 1110. For example, the I/O device 1106 includes a mouse 1202, a keyboard 1204, a display 1206 and a printer 1208 as shown in FIG. 2. It should be understood that the devices illustrated in FIG. 2 are not intended to limit the I/O device 1106, and the I/O device 1106 may further include other devices.

In the present embodiment, the memory storage apparatus 100 is coupled to other devices of the host system 1000 through the data transmission interface 1110. By using the microprocessor 1102, the random access memory 1104 and the Input/Output (I/O) device 1106, data may be written into the memory storage apparatus 100 or may be read from the memory storage apparatus 100. For example, the memory storage apparatus 100 may be a rewritable non-volatile memory storage apparatus such as a flash drive 1212, a memory card 1214, or a solid state drive (SSD) 1216 as shown in FIG. 2.

Figure 3:
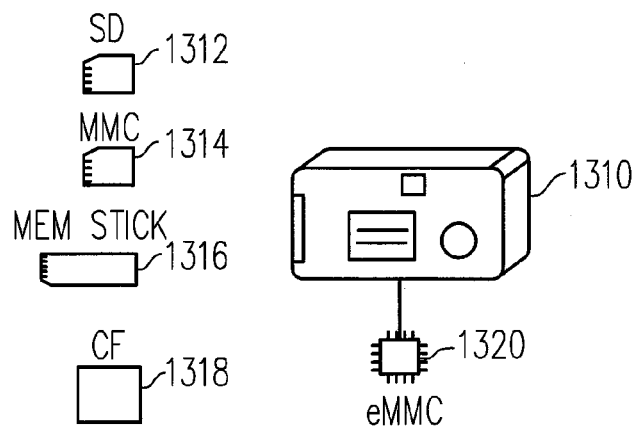
FIG. 3 is a schematic diagram of a host system and a memory storage apparatus according to an exemplary embodiment.

Generally, the host system 1000 may substantially be any system capable of storing data with the memory storage apparatus 100. Although the host system 1000 is described as a computer system in the present exemplary embodiment, the host system 1000 may be a digital camera, a video camera, a telecommunication device, an audio player, or a video player in another exemplary embodiment of the invention. For example, when the host system is a digital camera (video camera) 1310, the rewritable non-volatile memory storage apparatus may be a SD card 1312, a MMC card 1314, a memory stick 1316, a CF card 1318 or an embedded storage device 1320 (as shown in FIG. 3). The embedded storage device 1320 includes an embedded MMC (eMMC). It should be mentioned that the eMMC is directly coupled to a substrate of the host system.

Figure 4:
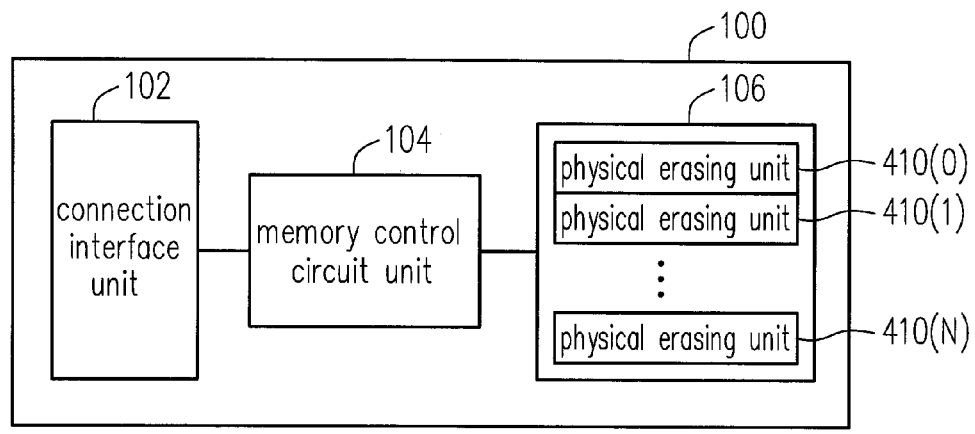
FIG. 4 is a schematic block diagram of the memory storage apparatus depicted in FIG. 1.

FIG. 4 is a schematic block diagram of the memory storage apparatus depicted in FIG. 1.

Referring to FIG. 4, the memory storage apparatus 100 includes a connection interface unit 102, a memory control circuit unit 104 and a rewritable non-volatile memory storage module 106.

In the present exemplary embodiment, the connection interface unit 102 is compatible with a serial advanced technology attachment (SATA) standard. However, the invention is not limited thereto, and the connection interface unit 102 may also be compatible to Parallel Advanced Technology Attachment (PATA) standard, Institute of Electrical and Electronic Engineers (IEEE) 1394 standard, Peripheral Component Interconnect (PCI) Express interface standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi Media Card (MMC) interface standard, Compact Flash (CF) interface standard, Integrated Device Electronics (IDE) interface standard or other suitable standards. In the present exemplary embodiment, the connection interface unit and the memory control circuit unit may be packaged into one chip, or emplaced outside of a chip containing the memory control circuit unit.

The memory control circuit unit 104 is configured to execute a plurality of logic gates or control instructions which are implemented in a hardware form or in a firmware form, so as to perform operations of writing, reading or erasing data in the rewritable non-volatile memory storage module 106 according to the commands of the host system 1000.

The rewritable non-volatile memory storage module 106 is coupled to the memory control circuit unit 104 and configured to store data written from the host system 1000. The rewritable non-volatile memory storage module 106 includes multiple physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit is composed by 64 physical programming units, 256 physical programming units or any amount of the physical programming units.

More specifically, the physical erasing unit is a minimum unit for erasing. Namely, each physical erasing unit contains the least number of memory cells to be erased together. The physical programming unit is a minimum unit for programming. That is, the physical programming unit is the minimum unit for writing data. Each physical programming unit usually includes a data bit area and a redundant bit area. The data bit area having multiple physical access addresses is used to store user data, and the redundant bit area is used to store system data (e.g., control information and error checking and correcting code). In the present exemplary embodiment, each data bit area of the physical programming unit contains 4 physical access addresses, and the size of each physical access address is 512 bytes. However, in other exemplary embodiments, more or less number of the physical access addresses may be contained in the data bit area, and amount and size of the physical access addresses are not limited in the invention. For example, in an exemplary embodiment, the physical erasing unit is a physical block, and the physical programming unit is a physical page or a physical sector, but the present invention is not limited thereto.

In the present exemplary embodiment, the rewritable non-volatile memory module 106 is a Multi Level Cell (MLC) NAND flash memory module (i.e., a flash memory module capable of storing two bits of data in one memory cell). However, the present invention is not limited thereto. The rewritable non-volatile memory module 106 may also be a Single Level Cell (SLC) NAND flash memory module, (i.e., a flash memory module capable of storing one bit of data in one memory cell), a Trinary Level Cell (TLC) NAND flash memory module (i.e., a flash memory module capable of storing three bits of data in one memory cell), other flash memory modules or any memory module having the same features.

Figure 5:
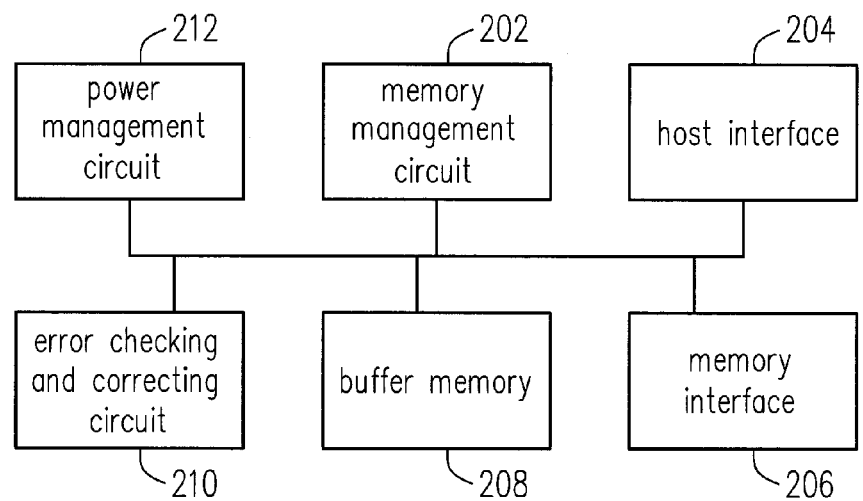
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 104 includes a memory management circuit 202, a host interface 204 and a memory interface 206.

The memory management circuit 202 is configured to control overall operations of the memory control circuit unit 104. Specifically, the memory management circuit 202 has a plurality of control commands. During operations of the memory storage apparatus 100, the control commands are executed to perform various operations such as writing, reading and erasing data.

In the present exemplary embodiment, the control commands of the memory management circuit 202 are implemented in a form of a firmware. For instance, the memory management circuit 202 has a microprocessor unit (not illustrated) and a read only memory (not illustrated), and the control commands are burned into the read only memory. During operations the memory storage apparatus 100, the control commands are executed by the microprocessor to perform the operations of writing, reading or erasing data.

In another exemplary embodiment of the invention, the control commands of the memory management circuit 202 may also be stored as program codes in a specific area (for example, the system area in a memory exclusively used for storing the system data) of the rewritable non-volatile memory module 106. In addition, the memory management circuit 202 has a microprocessor unit (not illustrated), the read only memory (not illustrated) and a random access memory (not illustrated). Particularly, the read only memory has an activate code, which is executed by the microprocessor unit to load the control commands stored in the rewritable non-volatile memory module 106 to the random access memory of the memory management circuit 202 when the memory control circuit unit 104 is enabled. Next, the control commands are executed by the microprocessor unit to perform the operations of writing, reading or erasing data.

Further, in another exemplary embodiment of the invention, the control commands of the memory management circuit 202 may also be implemented in a form of hardware. For example, the memory management circuit 202 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured for managing the physical erasing unit of the rewritable non-volatile memory module 106; the memory writing circuit is configured for issuing a write command to the rewritable non-volatile memory module 106 in order to write data into the rewritable non-volatile memory module; the memory reading circuit is configured for issuing a read command to the rewritable non-volatile memory module 106 in order to read data from the rewritable non-volatile memory module 106; the memory erasing circuit is configured for issuing an erase command to the rewritable non-volatile memory module 106 in order to erase data from the rewritable non-volatile memory module 106; the data processing circuit is configured for processing both the data to be written into the rewritable non-volatile memory module 106 and the data to be read from the rewritable non-volatile memory module 106.

The host interface 204 is coupled to the memory management circuit 202 and configured for receiving and identifying commands and data sent from the host system 1000. Namely, the commands and data sent from the host system 1000 are passed to the memory management circuit 202 through the host interface 204. In the present exemplary embodiment, the host interface 204 is compatible to a SATA standard. However, it should be understood that the present invention is not limited thereto, and the host interface 204 may also be compatible with a PATA standard, an IEEE 1394 standard, a PCI Express standard, a USB standard, a UHS-I standard, a UHS-II standard, a SD standard, a MS standard, a MMC standard, a CF standard, an IDE standard, or other suitable standards for data transmission.

The memory interface 206 is coupled to the memory management circuit 202 and configured to access the rewritable non-volatile memory module 106. That is, data to be written to the rewritable non-volatile memory module 106 is converted to a format acceptable to the rewritable non-volatile memory module 106 through the memory interface 206.

In an exemplary embodiment, the memory control circuit unit 104 further includes a buffer memory 208, a power management circuit 210 and an error checking and correcting circuit 212.

The buffer memory 208 is coupled to the memory management circuit 202 and configured to temporarily store data and commands from the host system 1000 or data from the rewritable non-volatile memory module 106.

The power management unit 210 is coupled to the memory management circuit 202 and configured to control a power of the memory storage apparatus 100.

The error checking and correcting circuit 212 is coupled to the memory management circuit 202 and configured to perform an error checking and correcting process to ensure the correctness of data. Specifically, when the memory management circuit 202 receives a write command from the host system 1000, the error checking and correcting circuit 212 generates an error checking and correcting code (ECC code) for data corresponding to the write command, and the memory management circuit 202 writes data and the ECC code corresponding to the write command to the rewritable non-volatile memory module 106. Next, when reading data from the rewritable non-volatile memory module 106, the memory management circuit 202 also reads the ECC Code corresponding to such data, and the error checking and correcting circuit 212 performs an error checking and correcting process on the read data based on the read ECC code.

Figure 6:
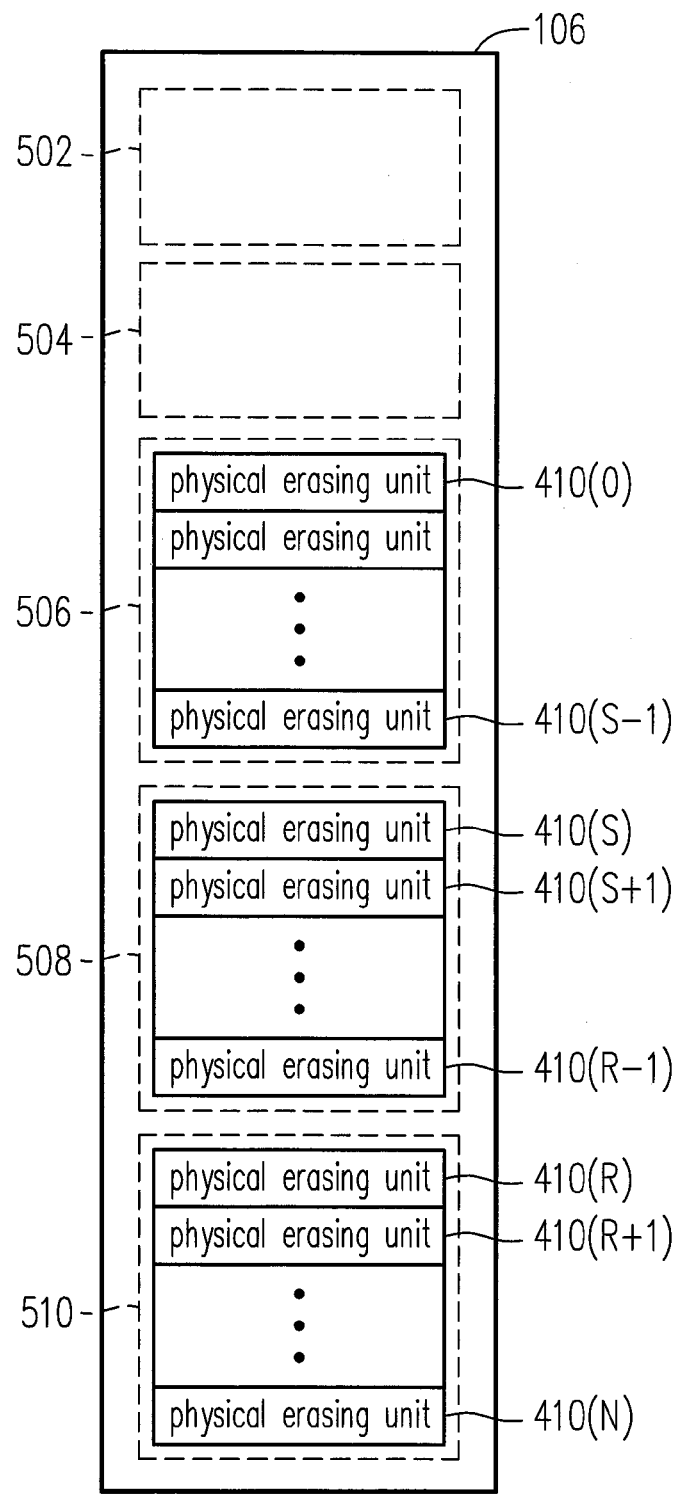
FIG. 6 and FIG. 7 are schematic diagrams illustrating a management of physical blocks according to first exemplary embodiment.
Figure 7:
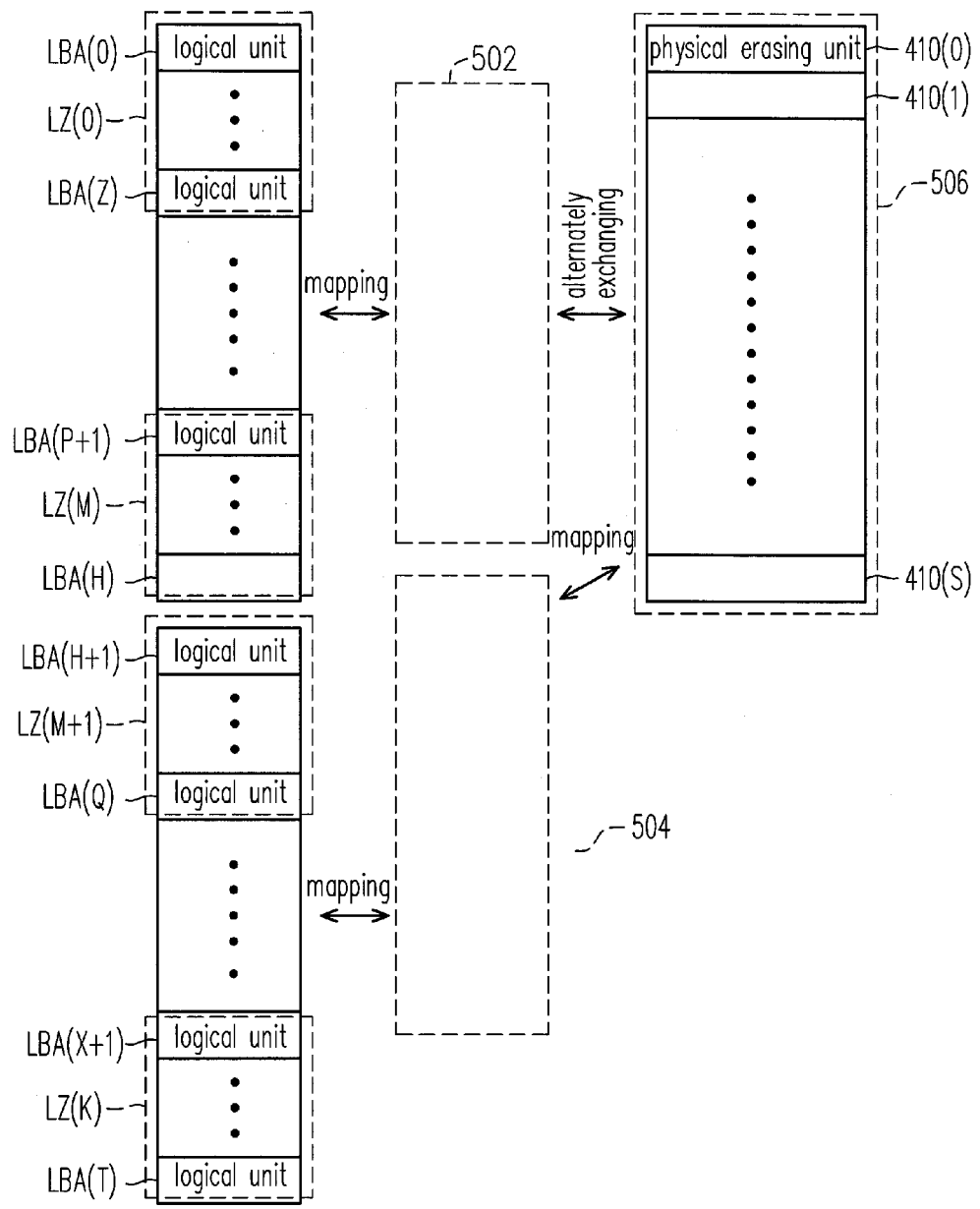

FIG. 6 and FIG. 7 are schematic diagrams illustrating a management of physical erasing units according to first exemplary embodiment.

Referring to FIG. 6, during operations of the memory storage apparatus 100, the memory control circuit unit 104 (or the memory management circuit 202) dynamically associates the physical erasing units 410(0) to 410(N) with a data area 502, a backup area 504, a spare area 506, a system area 508 and a replacement area 510.

The physical erasing units associated with the data area 502 are deemed as the physical erasing units already stored with data from the host system 1000. In other words, when the write command and the data to be written are received from the host system 1000, the memory management unit 202 may get the physical erasing units from the spare area 506, write the data into the gotten physical erasing units, and associate the physical erasing units written with data with the data area 502.

The physical erasing units associated with the spare area 504 are deemed as the physical erasing units already stored with a backup data from the host system 1000. For example, in the present exemplary embodiment, the host system 1000 is disposed with an uninterruptable power supply (not illustrated). In case an external power of the host system 1000 is malfunctioned, the uninterruptable power supply may be activated and a backup write command may be issued by the microprocessor 1102 to the memory storage apparatus 100 during a period in which limited power is provided by the uninterruptable power supply, so as to instantly back up the data temporarily stored in the random access memory 1104. In this case, the memory control circuit unit 104 (or the memory management circuit 202) gets the physical erasing units from the spare area 506, writes the backup data to be stored by the host system 100 into the gotten physical erasing units, and associates the physical erasing units written with the backup data with the backup area 504.

The physical erasing units associated to the spare area 506 are empty physical erasing units or physical erasing units stored with invalid data, and configured to alternatively exchange the physical erasing units of the data area 502 and the physical erasing units of the backup area 504. More specifically, when the data in the physical erasing units of the data area 502 or the backup area 504 become invalid, the memory control circuit unit 104 (or the memory management circuit 202) re-associates said physical erasing units back with the spare area 506 for subsequent processes in writing operation.

The physical erasing units associated with the system area 508 are configured to record the system data. For example, the system data includes information related to manufacturer and model of the rewritable non-volatile memory module, a number of physical erasing units in the rewritable non-volatile memory module, a number of the physical programming units in each physical erasing unit, and so forth.

The physical erasing units logically associated with the replacement area 510 are used in a bad physical erasing unit replacement procedure for replacing damaged physical erasing units in the rewritable non-volatile memory module 106. For instance, if available physical erasing units are still existed in the replacement area 510 when the physical erasing units of the data area 502 are damaged, the memory management circuit 202 may get the available physical erasing units from the replacement area 510 for replacing the damaged physical erasing units.

For instance, as shown in FIG. 6, when the memory storage apparatus 100 is initialized (i.e., under a formatting process), the physical erasing units 410(0) to 410(S-1) are associated with the spare area 506, the physical erasing units 410(S) to 410(R-1) written with the system data are associated with the system area 508, and the remaining physical erasing units 410(R) to 410(N) are associated with the replacement area 510. It should be understood that, the numbers of the physical erasing units associated with the data area 502, the backup area 504, the spare area 506, the system area 508 and the replacement area 510 may be different from one another according to the different memory specifications. Particularly, in another exemplary embodiment, when the memory storage apparatus 100 is initialized (i.e., also known as the formatting process), a part of the physical erasing units may be directly associated with the data area 502, and deemed as already being stored with data.

Referring to FIG. 7, the memory control circuit unit 104 (or the memory management circuit 202) disposes logical units LBA(0) to LBA(H) (also known as a system logical unit area) to be mapped to the physical erasing units associated with the data area 502, and disposes logical units LBA(H+1) to LBA(T) (also known as a backup logical unit area) to be mapped to the physical erasing units associated with the backup area 504. Each of the logical units has a plurality of logical pages to be mapped to the physical programming units of the corresponding physical erasing unit. Further, when the host system 1000 intends to write the data into the logical units or update the data stored in the logical units, the memory control circuit unit 104 (or the memory management unit 202) may get one physical erasing unit from the spare area 506 for writing the data, so as to alternately exchange the physical erasing units of the data area 502 and the spare area 504.

In order to identify which of the physical erasing units that is stored with the data of each logical unit, in the present exemplary embodiment, the memory control circuit unit 104 (or the memory management circuit 202) may record the mapping relations between the logical units and the physical erasing units. Further, when the host system 1000 intends to access the data in the logical pages, the memory control circuit unit 104 (or the memory management circuit 202) may first confirm the logical unit belonging to the logical page, and access the data in the physical erasing units mapped to said logical unit. For instance, in the present exemplary embodiment, the memory control circuit unit 104 (or the memory management circuit 202) may store a logical-to-physical address mapping table in the rewritable non-volatile memory module 106 for recording the physical erasing units mapped to each of the logical units, and the logical-to-physical address mapping table are loaded into the buffer memory 208 for maintenance when the memory control circuit unit 104 (or the memory management circuit 202) intends to the access the data.

It should be noted that, the mapping table cannot record the mapping relation for all of the logical units because a capacity of the buffer memory 208 is limited. Therefore, in the present exemplary embodiment, the memory control circuit unit 104 (or the memory management unit 202) groups the logical units LBA(0) to LBA(T) as a plurality of logical zones LZ(0) to LZ(K), and configures one logical-to-physical address mapping table for each of the logical zones. In particular, when the memory control circuit unit 104 (or the memory management unit 202) intends to update the mapping table for one specific logical unit, the logical-to-physical address mapping table of the logical zone correspondingly belonging to the logical unit is loaded into the buffer memory 208 for updating.

As described above, in the present exemplary embodiment, the rewritable non-volatile memory module 106 of the memory storage apparatus 100 is of the page-based management. Accordingly, when the write command is executed, regardless of the logical pages of the which logical unit are to be written, the memory control circuit unit 104 (or the memory management unit 202) may write the data in a manner of one physical programming unit after another physical programming unit. More specifically, the memory control circuit unit 104 (or the memory management circuit 202) may get an empty physical erasing unit from the spare area 506 to be used as a current physical erasing unit for writing data. Further, when the current physical erasing unit used is fully written, the memory control circuit unit 104 (or the memory management circuit 202) may get another empty physical erasing unit from the spare area 506 to be used as the current physical erasing unit used to continuously write a random data corresponding to the write command from the host system 1000. Particularly, in order to prevent the physical erasing units of the spare area 506 from being used up, when a number of the physical erasing units of the spare area 506 is reduced to a garbage collecting threshold, the memory control circuit unit 104 (or the memory management circuit 202) may execute a data merging operation, so that the data of at least one physical erasing unit of the data area 502 or the spare area 504 may become the invalid data, and the physical erasing unit storing only the invalid data in the data area 502 or the spare area 504 are then associated back with the spare area 506. For instance, when the data merging operation is executed, the memory control circuit unit 104 (or the memory management circuit 202) needs to use at least one empty physical erasing unit. Therefore, the garbage collecting threshold is set to be at least grater than a minimum threshold (i.e., 1). Particularly, in the present exemplary embodiment, the memory control circuit unit 104 (or the memory management circuit 202) reserves a predetermined number of physical erasing units in the spare area 506 for the data to be written into the logical units LBA(H+1) to LBA(T). Therefore, when the memory storage apparatus 100 is initialized (i.e., also known as a formatting process), the memory control circuit unit 104 (or the memory management circuit 202) sets a value obtained by summing a minimum threshold and the predetermined number as the garbage collecting threshold.

FIGS. 8 to 20 illustrate an example of writing data according to an exemplary embodiment of the invention.

Figure 8:
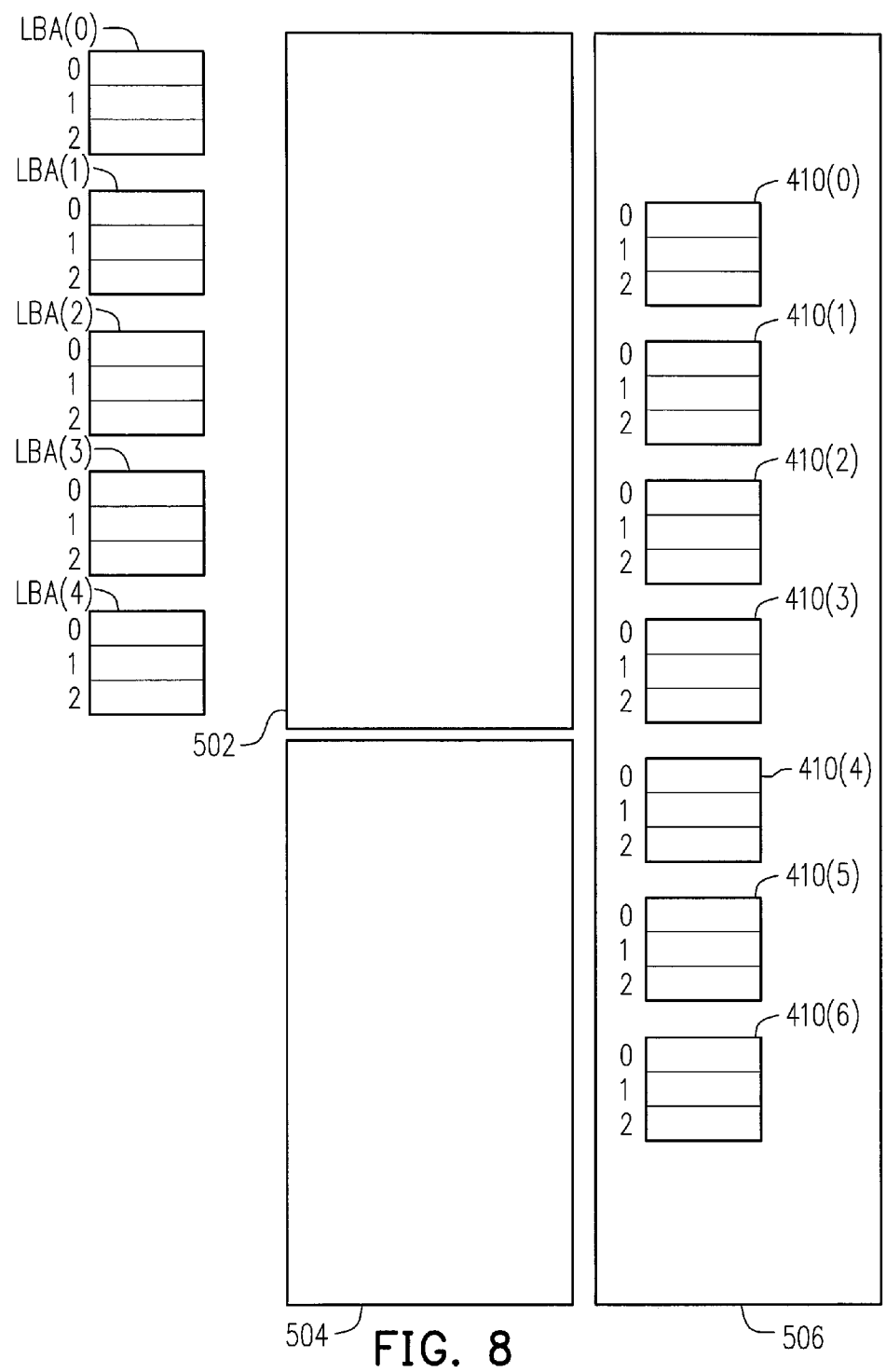
FIGS. 8 to 20 are schematic diagrams illustrating a random data written by using a random writing mechanism according to an exemplary embodiment.

Referring to FIG. 8, for convenience of illustration, it is assumed that the data area 502 is initially not included with the physical erasing units mapped to the logical units (i.e., the memory storage apparatus 100 is not yet written with the user data after the formatting process); the spare area 506 includes seven physical erasing units; each of the physical erasing units includes three physical programming units; and the data to be written into each of the physical erasing units are written according to a sequence of the physical programming units. In addition, it is also assumed that two of the physical erasing units are reserved dedicating to write the data to be stored by the host system 1000 to the backup logical unit area; one of the physical erasing units is used for writing the data alternately; and one of the physical erasing units is reserved for the data merging operation. Accordingly, the garbage collecting threshold is initially set to 3. Three logical units LBA(0) to LBA(2) are arranged to be mapped to the physical erasing units associated with the data area 502, and two logical units LBA(3) to LBA(4) are arranged to be mapped to the physical erasing units associated with the backup area 504.

Figure 9:
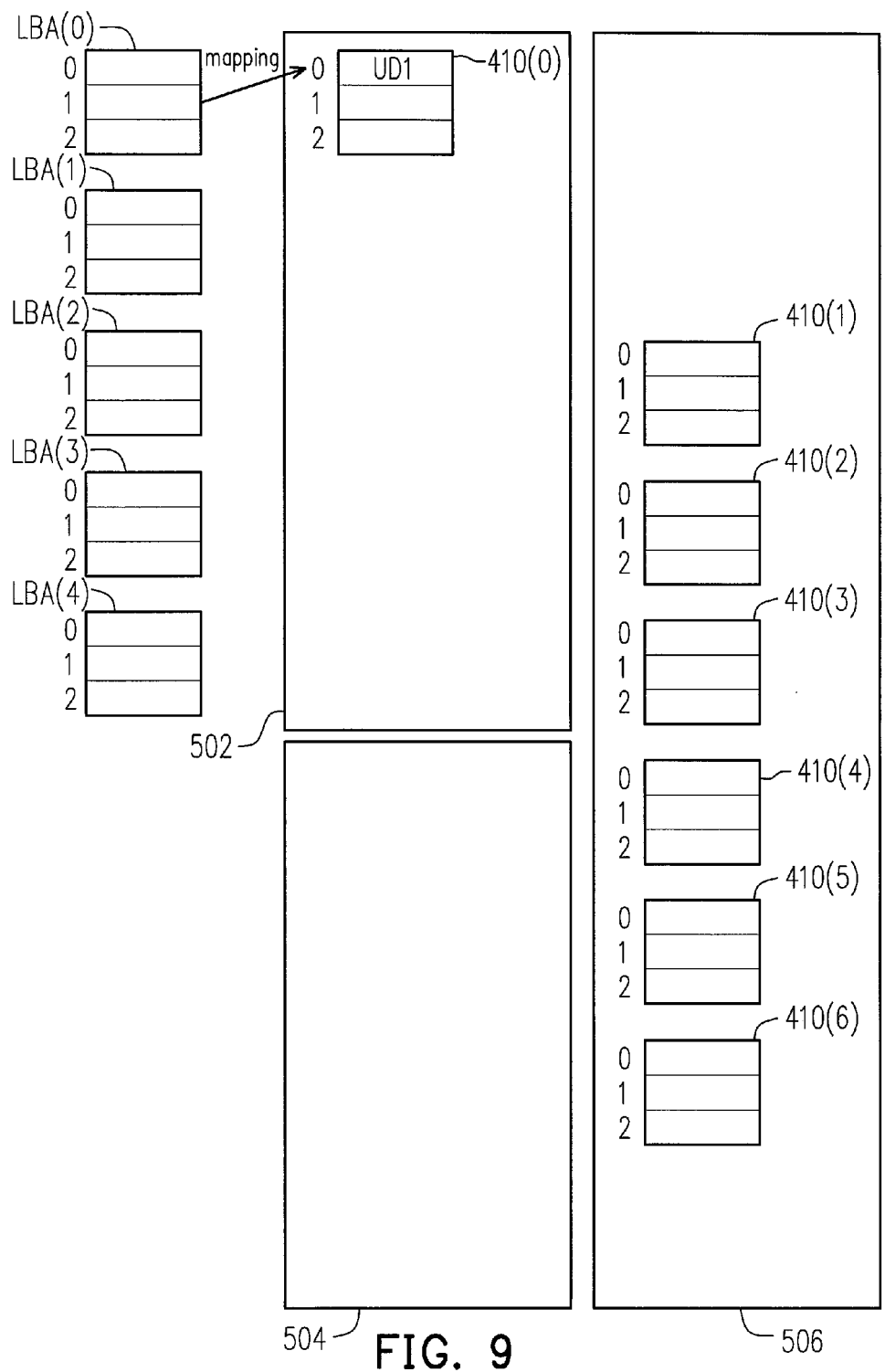

Referring to FIG. 9, it is assumed data UD1 is to be programmed and the data UD1 belongs to a first logical page of the logical unit LBA(0), the memory control circuit unit 104 (or the memory management circuit 202) may get the physical erasing unit 410(0) from the spare area 506, issue a programming command to write the data UD1 into a zeroth physical programming unit of the physical erasing unit 410(0), and associate the physical erasing unit 410(0) with the data area 502. In addition, the memory control circuit unit 104 (or the memory management circuit 202) records that the first logical page of the logical unit LBA(0) is mapped to the zeroth physical programming unit of the physical erasing unit 410(0) in the logical-to-physical address mapping table.

Figure 10:
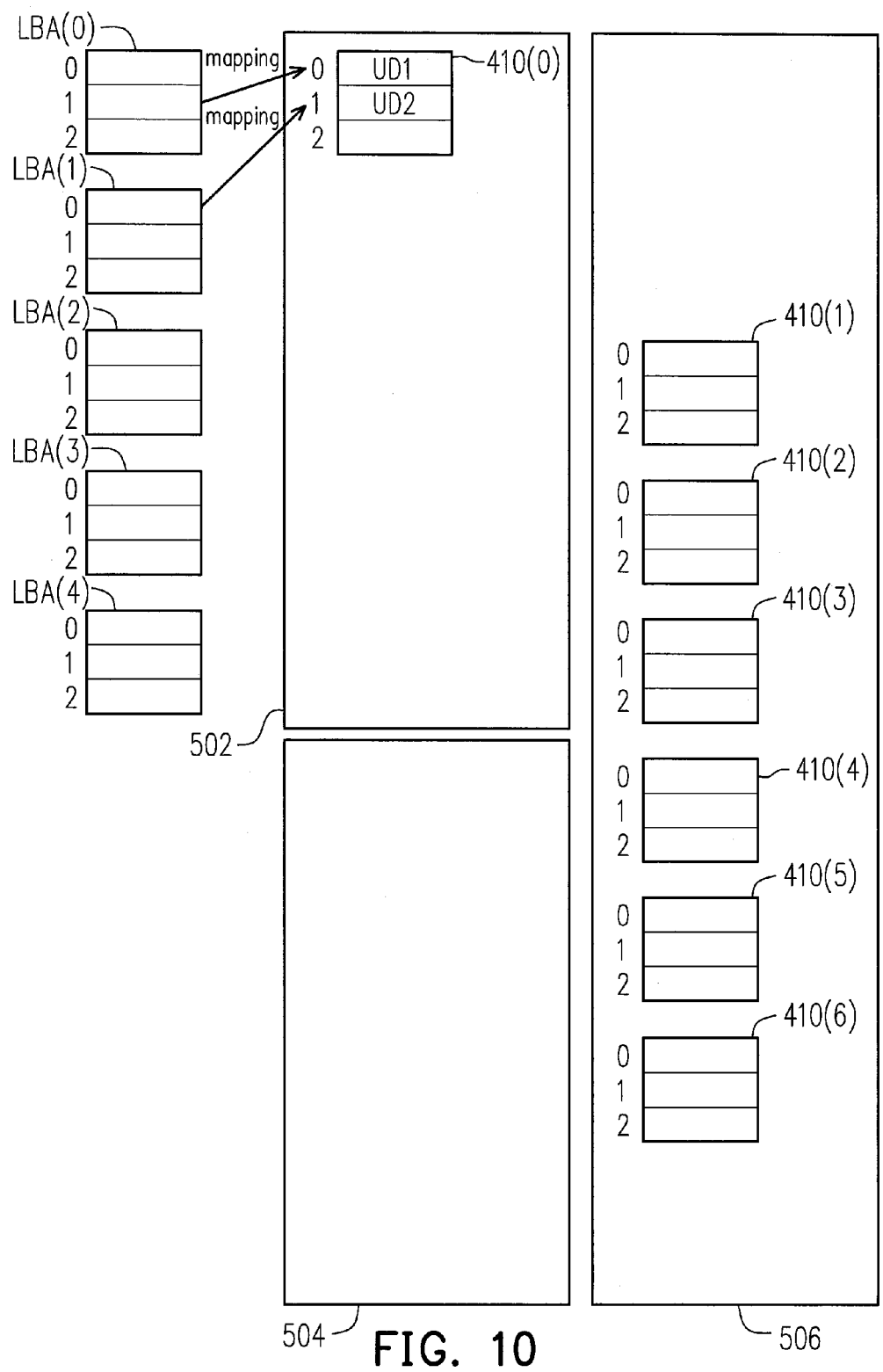

Referring to FIG. 10 as continuation of FIG. 9, it is assumed that data UD2 is to be further programmed and the data UD2 belongs to a zeroth logical page of the logical unit LBA(1), the memory control circuit unit 104 (or the memory management circuit 202) may issue a programming command to write the data UD2 into a first physical programming unit of the physical erasing unit 410(0). In addition, the memory control circuit unit 104 (or the memory management circuit 202) records that the zeroth logical page of the logical unit LBA(1) is mapped to the first physical programming unit of the physical erasing unit 410(0) in the logical-to-physical address mapping table.

Figure 11:
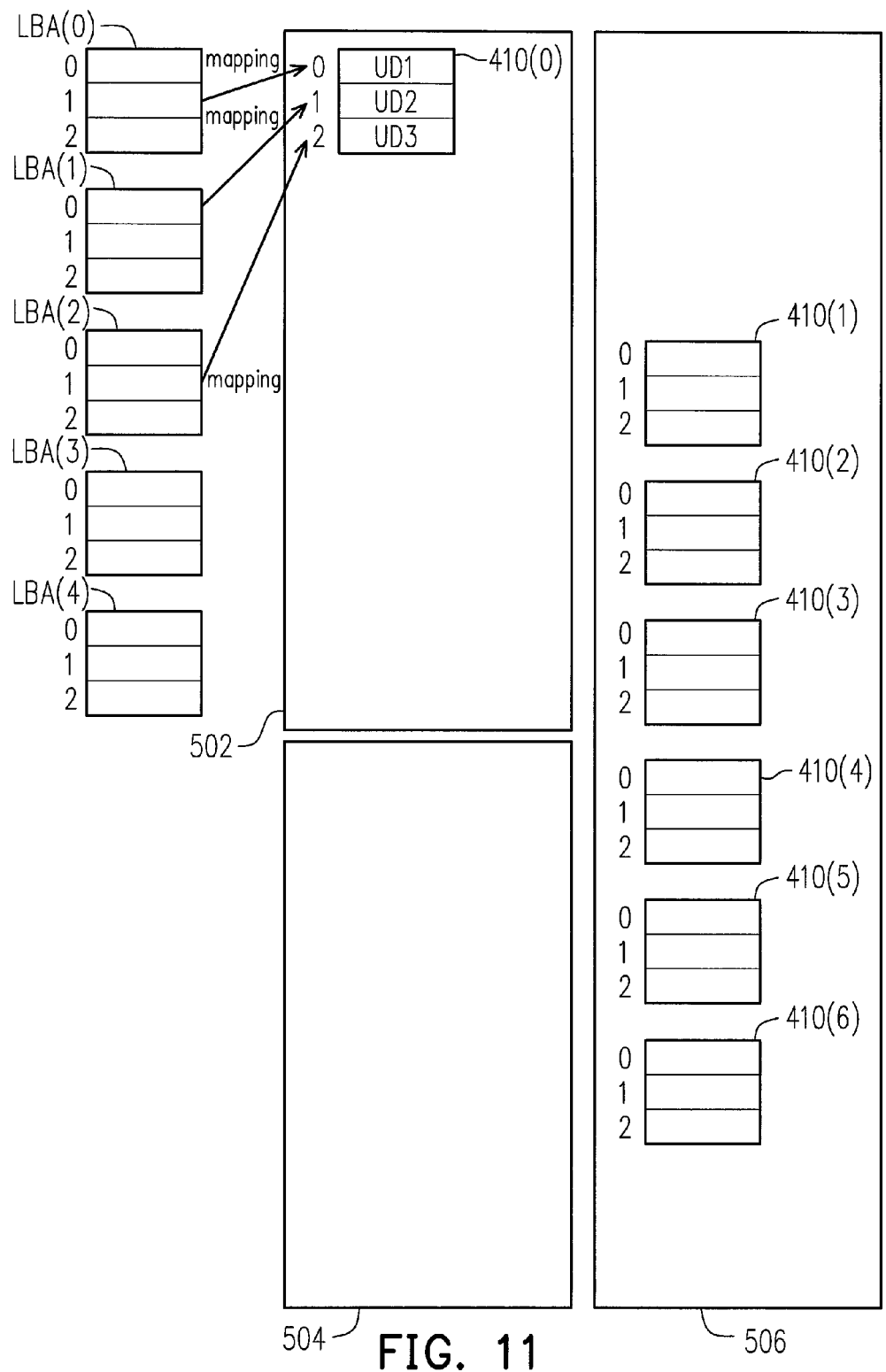

Referring to FIG. 11 as continuation of FIG. 10, it is assumed that data UD3 is to be further programmed and the data UD3 belongs to a first logical page of the logical unit LBA(2), the memory control circuit unit 104 (or the memory management circuit 202) may issue a programming command to write the data UD3 into a second physical programming unit of the physical erasing unit 410(1). In addition, the memory control circuit unit 104 (or the memory management circuit 202) records that the first logical page of the logical unit LBA(2) is mapped to the second physical programming unit of the physical erasing unit 410(1) in the logical-to-physical address mapping table.

Figure 12:
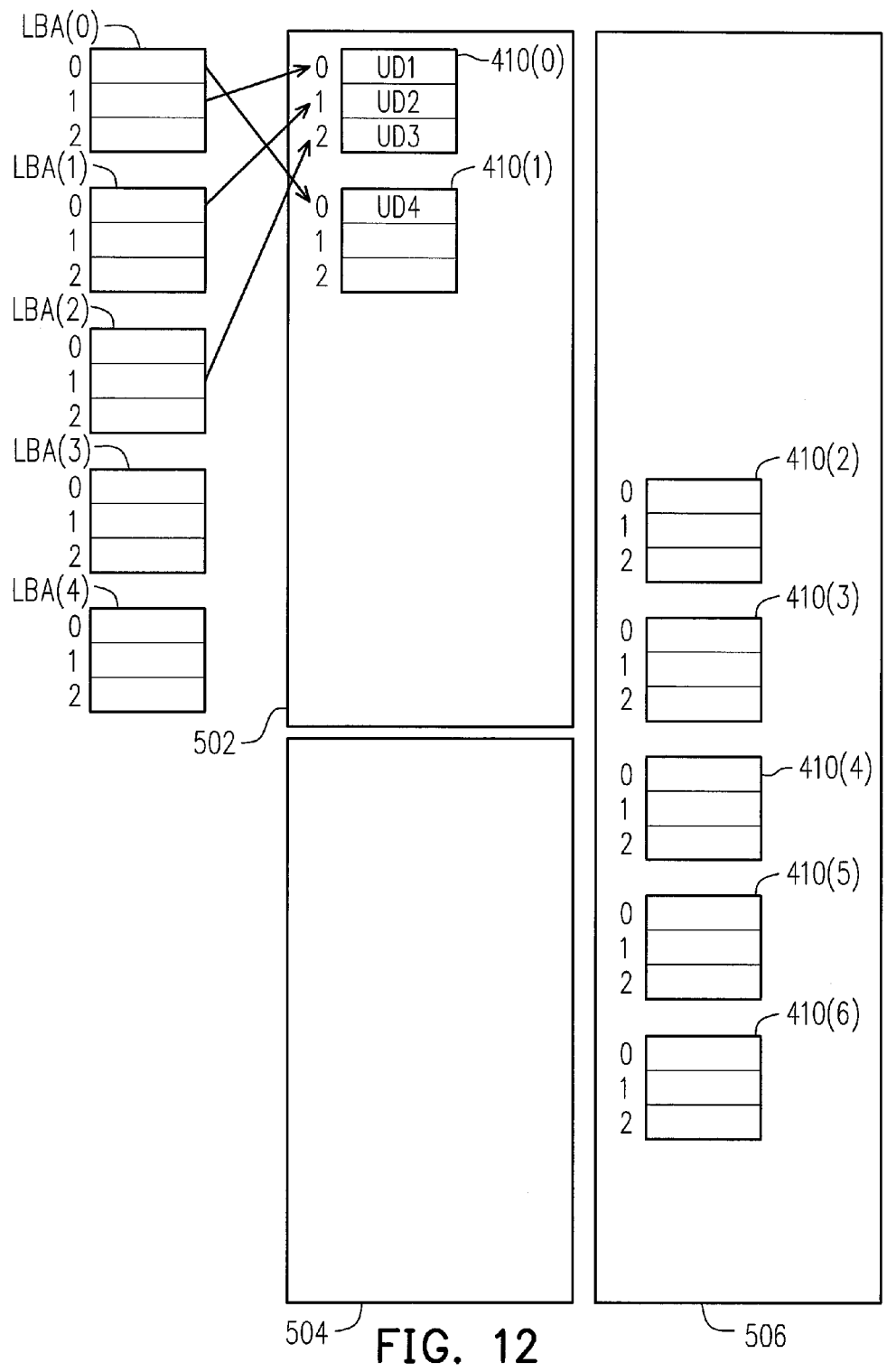

Referring to FIG. 12 as continuation of FIG. 11, it is assumed that data UD4 is to be further programmed and the data UD4 belongs to a zeroth logical page of the logical unit LBA(0), but the physical erasing unit 410(0) is out of storage spaces. Therefore, the memory control circuit unit 104 (or the memory management circuit 202) may get the physical erasing unit 410(1) from the spare area 506, issue a programming command to write the data UD4 into a zeroth physical programming unit of the physical erasing unit 410(1), and associate the physical erasing unit 410(1) with the data area 502. In addition, the memory control circuit unit 104 (or the memory management circuit 202) records that the zeroth logical page of the logical unit LBA(0) is mapped to the zeroth physical programming unit of the physical erasing unit 410(1) in the logical-to-physical address mapping table.

Figure 13:
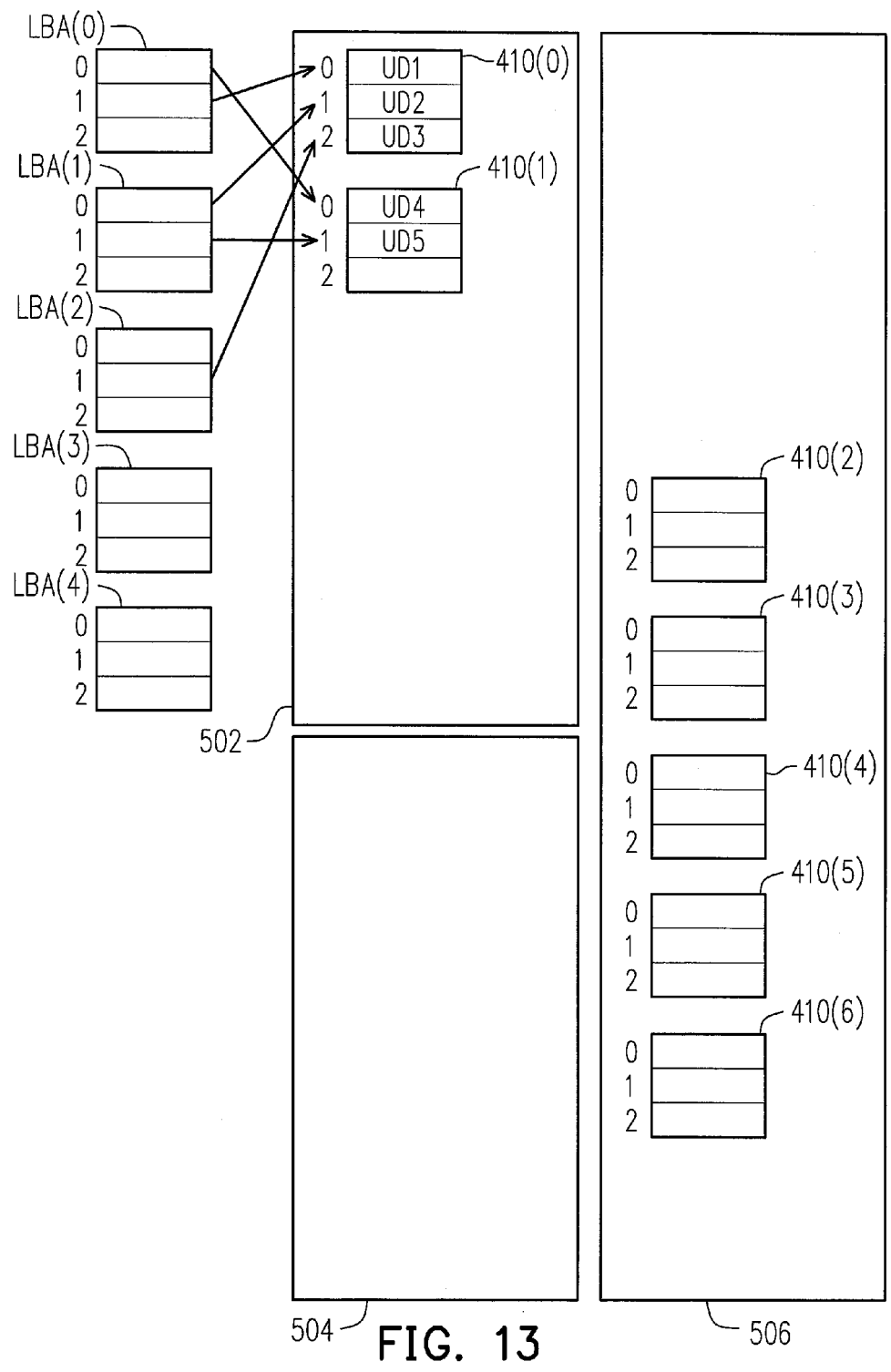

Referring to FIG. 13 as continuation of FIG. 12, it is assumed that data UD5 is to be further programmed and the data UD5 belongs to a first logical page of the logical unit LBA(1), the memory control circuit unit 104 (or the memory management circuit 202) may issue a programming command to write the data UD5 into a first physical programming unit of the physical erasing unit 410(1). In addition, the memory control circuit unit 104 (or the memory management circuit 202) records that the first logical page of the logical unit LBA(1) is mapped to the first physical programming unit of the physical erasing unit 410(1) in the logical-to-physical address mapping table.

Figure 14:
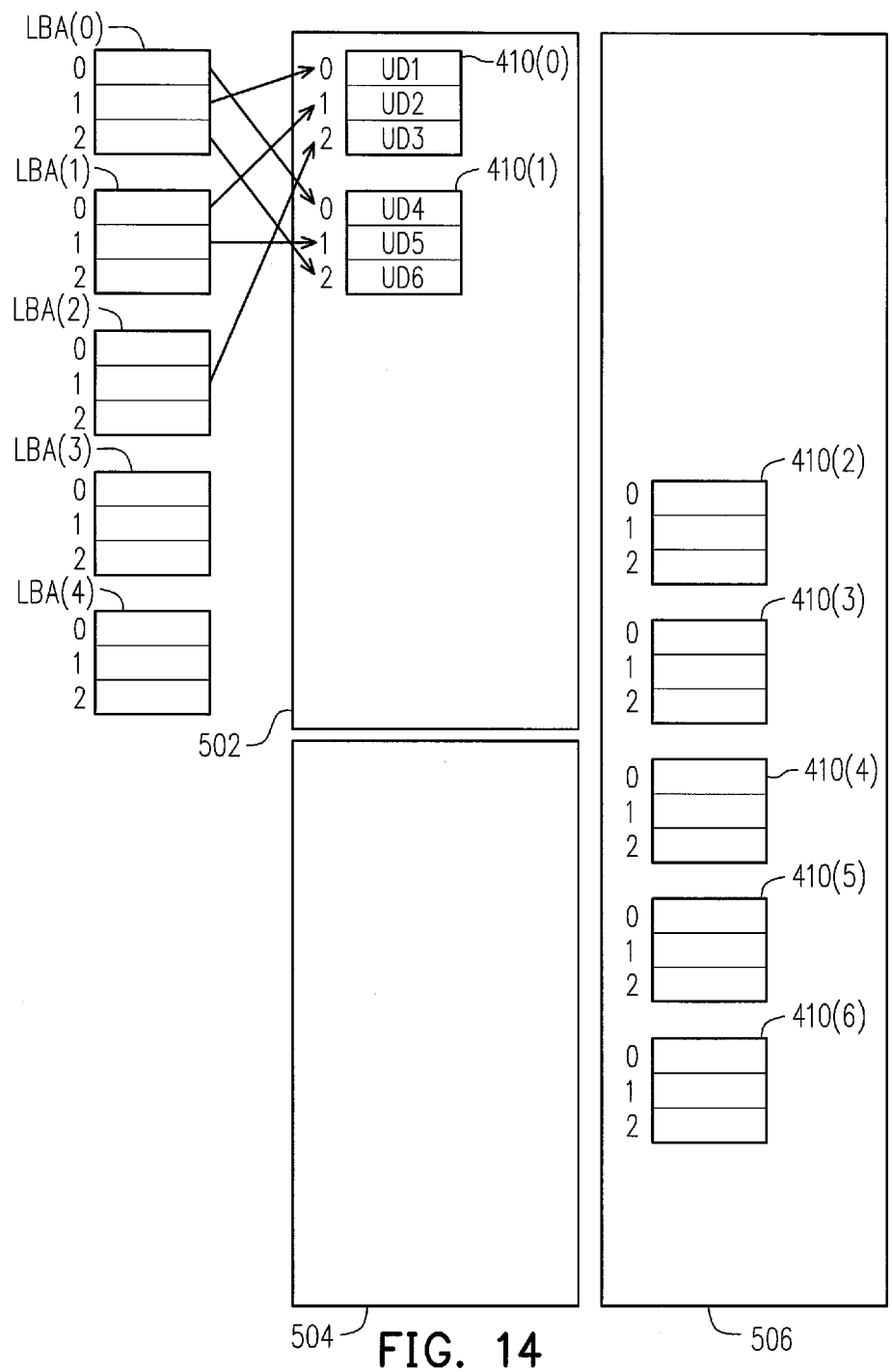

Referring to FIG. 14 as continuation of FIG. 13, it is assumed that data UD6 is to be further programmed and the data UD6 belongs to a second logical page of the logical unit LBA(0), the memory control circuit unit 104 (or the memory management circuit 202) may issue a programming command to write the data UD6 into a second physical programming unit of the physical erasing unit 410(1). In addition, the memory control circuit unit 104 (or the memory management circuit 202) records that the second logical page of the logical unit LBA(0) is mapped to the second physical programming unit of the physical erasing unit 410(1) in the logical-to-physical address mapping table.

Figure 15:
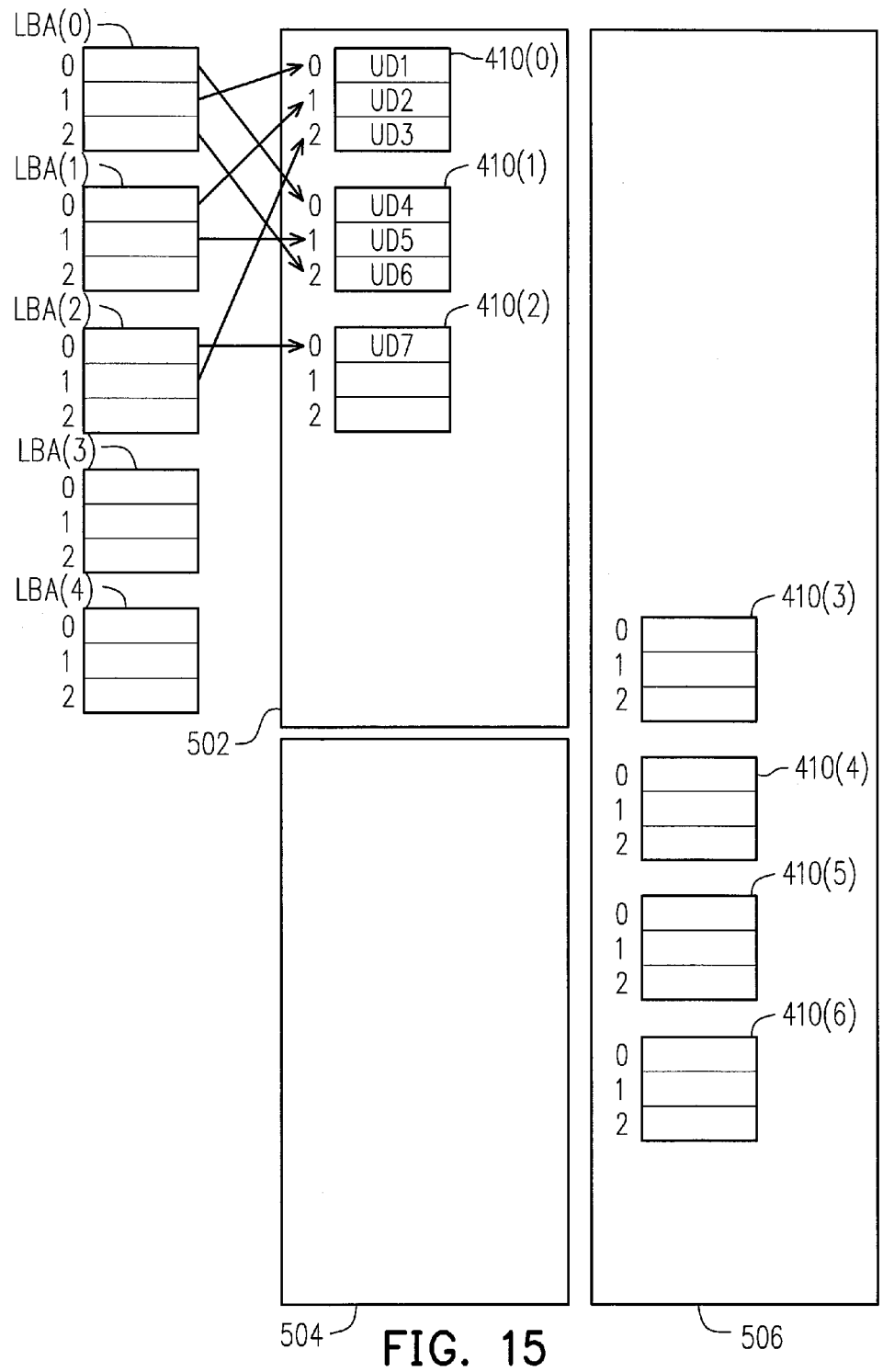

Referring to FIG. 15 as continuation of FIG. 14, it is assumed that data UD7 is to be further programmed and the data UD7 belongs to a zeroth logical page of the logical unit LBA(2), but the physical erasing unit 410(1) is out of storage spaces. Therefore, the memory control circuit unit 104 (or the memory management circuit 202) may get the physical erasing unit 410(2) from the spare area 506, issue a programming command to write the data UD7 into a zeroth physical programming unit of the physical erasing unit 410(2), and associate the physical erasing unit 410(2) with the data area 502. In addition, the memory control circuit unit 104 (or the memory management circuit 202) records that the zeroth logical page of the logical unit LBA(2) is mapped to the zeroth physical programming unit of the physical erasing unit 410(2) in the logical-to-physical address mapping table.

Figure 16:
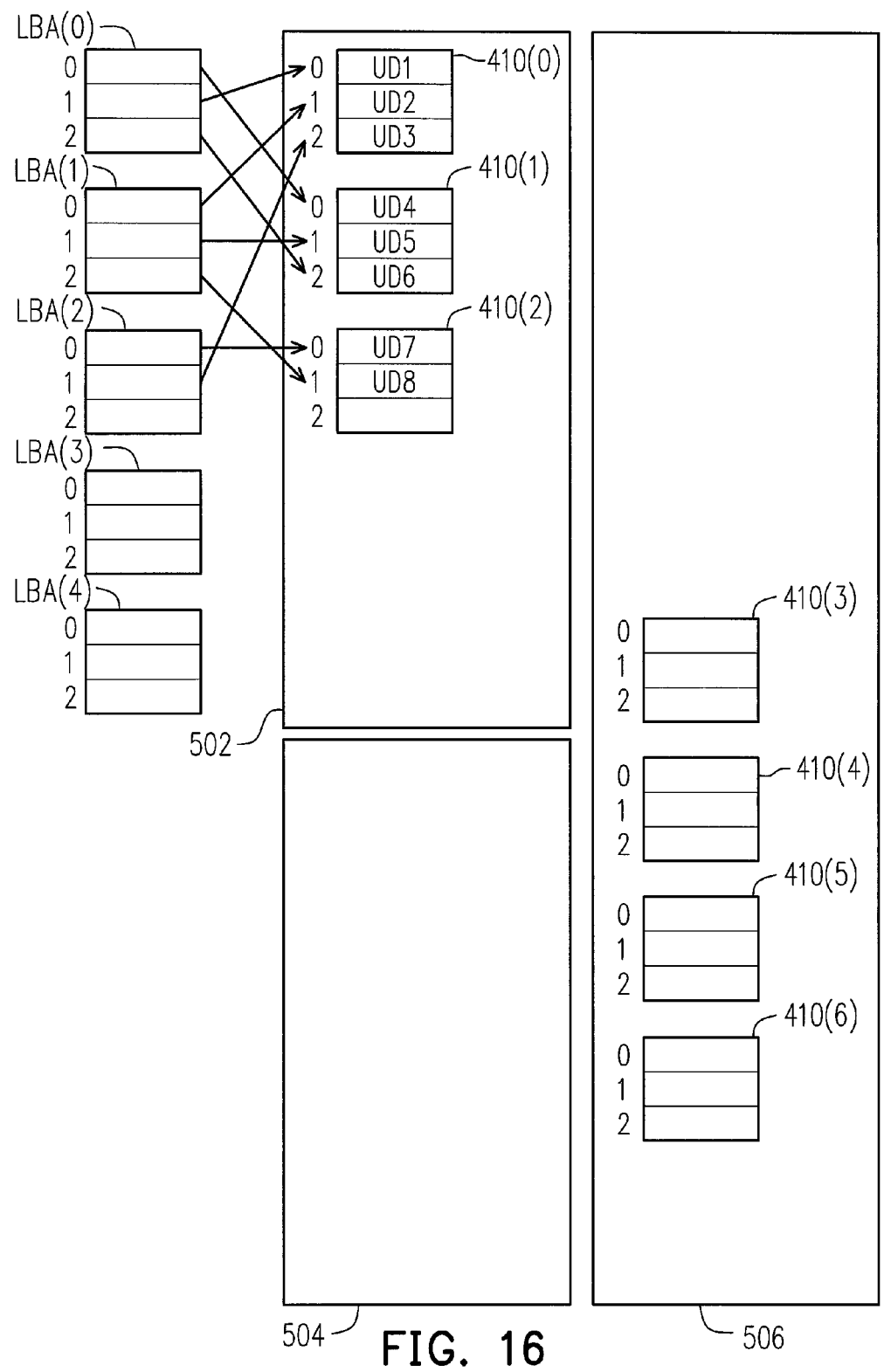

Referring to FIG. 16 as continuation of FIG. 15, it is assumed that data UD8 is to be further programmed and the data UD8 belongs to a second logical page of the logical unit LBA(1), the memory control circuit unit 104 (or the memory management circuit 202) may issue a programming command to write the data UD8 into a first physical programming unit of the physical erasing unit 410(2). In addition, the memory control circuit unit 104 (or the memory management circuit 202) records that the second logical page of the logical unit LBA(1) is mapped to the first physical programming unit of the physical erasing unit 410(2) in the logical-to-physical address mapping table.

Figure 17:
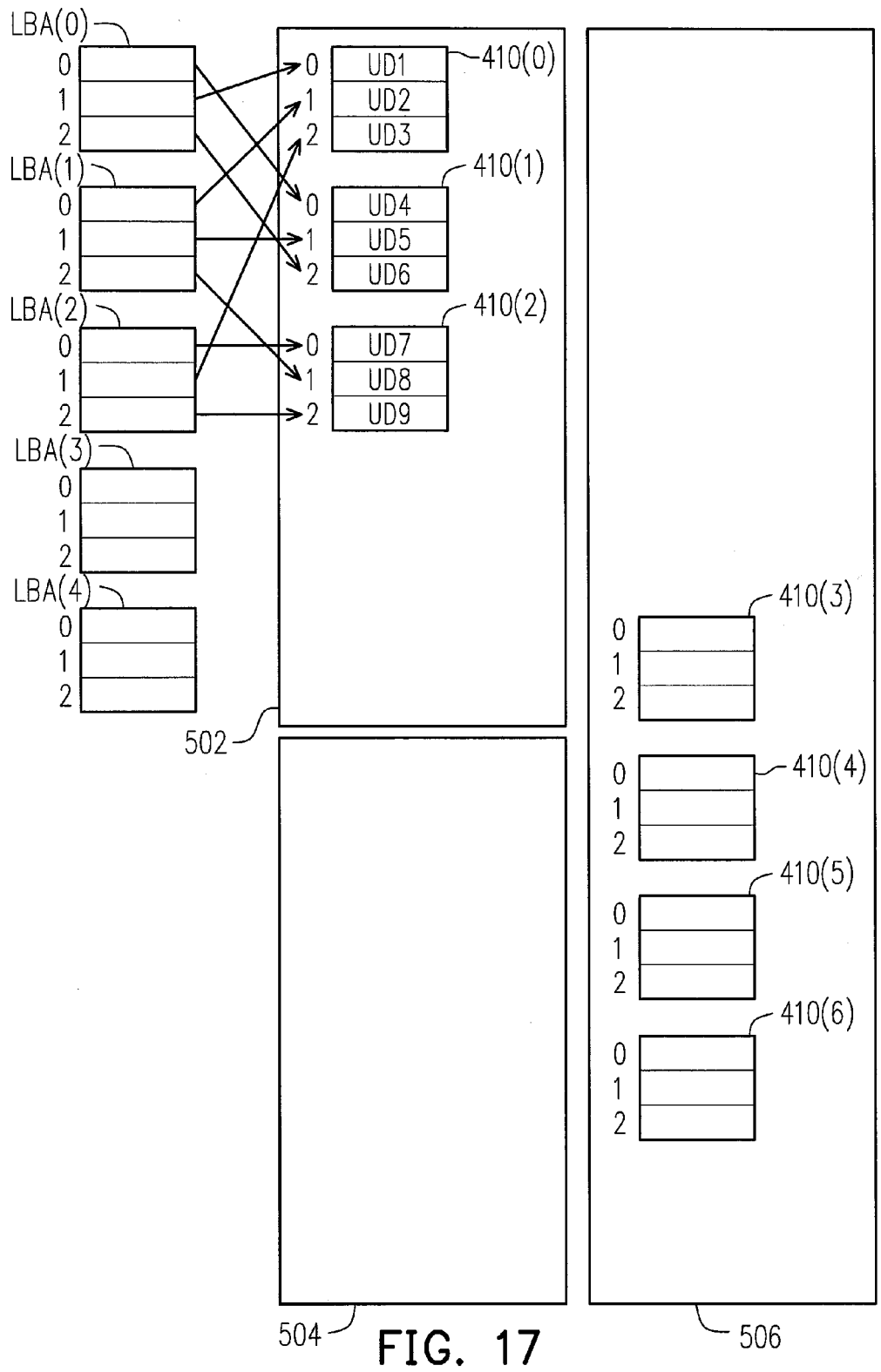

Referring to FIG. 17 as continuation of FIG. 16, it is assumed that data UD9 is to be further programmed and the data UD9 belongs to a second logical page of the logical unit LBA(2), the memory control circuit unit 104 (or the memory management circuit 202) may issue a programming command to write the data UD9 into a second physical programming unit of the physical erasing unit 410(2). In addition, the memory control circuit unit 104 (or the memory management circuit 202) records that the second logical page of the logical unit LBA(2) is mapped to the second physical programming unit of the physical erasing unit 410(2) in the logical-to-physical address mapping table.

Figure 18:
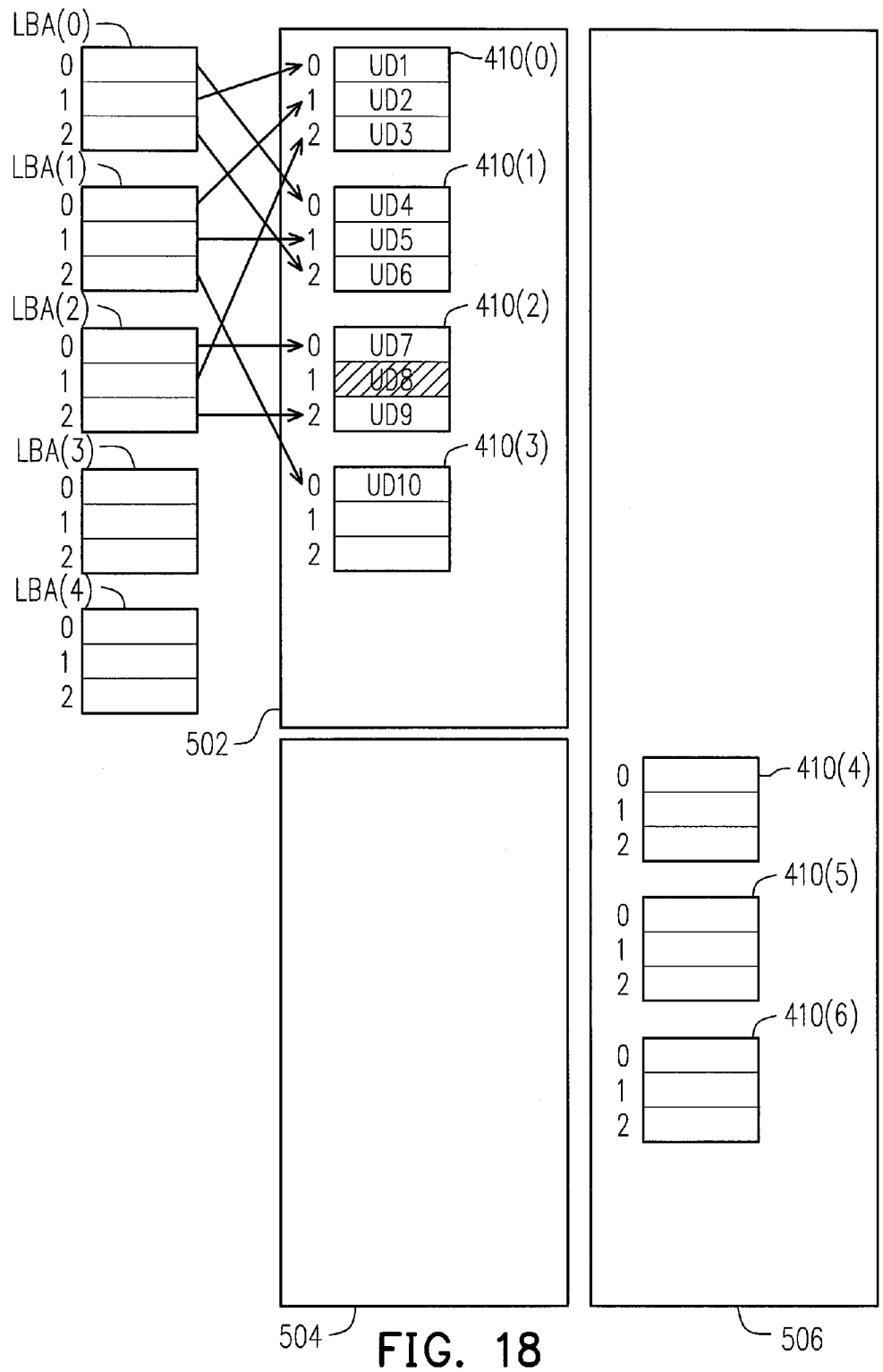

Referring to FIG. 18 as continuation of FIG. 17, it is assumed that data UD10 is to be further programmed and the data UD10 belongs to a second logical page of the logical unit LBA(1), but the physical erasing unit 410(2) is out of storage spaces. Therefore, the memory control circuit unit 104 (or the memory management circuit 202) may get the physical erasing unit 410(3) from the spare area 506, issue a programming command to write the data UD10 into a zeroth physical programming unit of the physical erasing unit 410(3), and associate the physical erasing unit 410(3) with the data area 502. Therein, the first physical programming unit of the physical erasing unit 410(2) is marked as invalid (as shown by a dash line). In addition, the memory control circuit unit 104 (or the memory management circuit 202) records that the second logical page of the logical unit LBA(1) is mapped to the zeroth physical programming unit of the physical erasing unit 410(3) in the logical-to-physical address mapping table.

Figure 19:
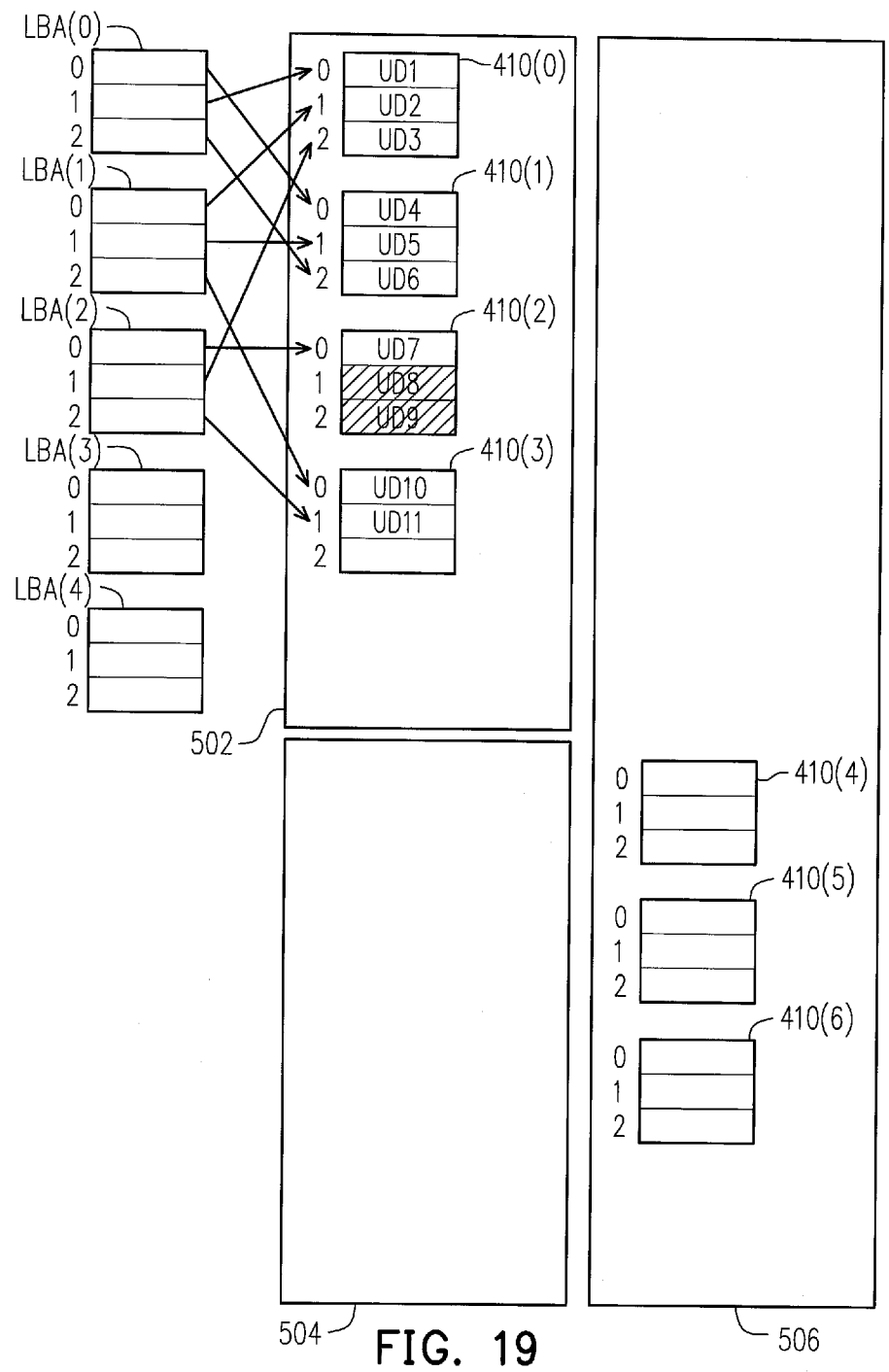

Referring to FIG. 19 as continuation of FIG. 18, it is assumed that data UD11 is to be further programmed and the data UD11 belongs to a second logical page of the logical unit LBA(2), the memory control circuit unit 104 (or the memory management circuit 202) may issue a programming command to write the data UD11 into a first physical programming unit of the physical erasing unit 410(3). Therein, the second physical programming unit of the physical erasing unit 410(2) is marked as invalid (as shown by a dash line). In addition, the memory control circuit unit 104 (or the memory management circuit 202) records that the second logical page of the logical unit LBA(2) is mapped to the first physical programming unit of the physical erasing unit 410(3) in the logical-to-physical address mapping table.

Figure 20:
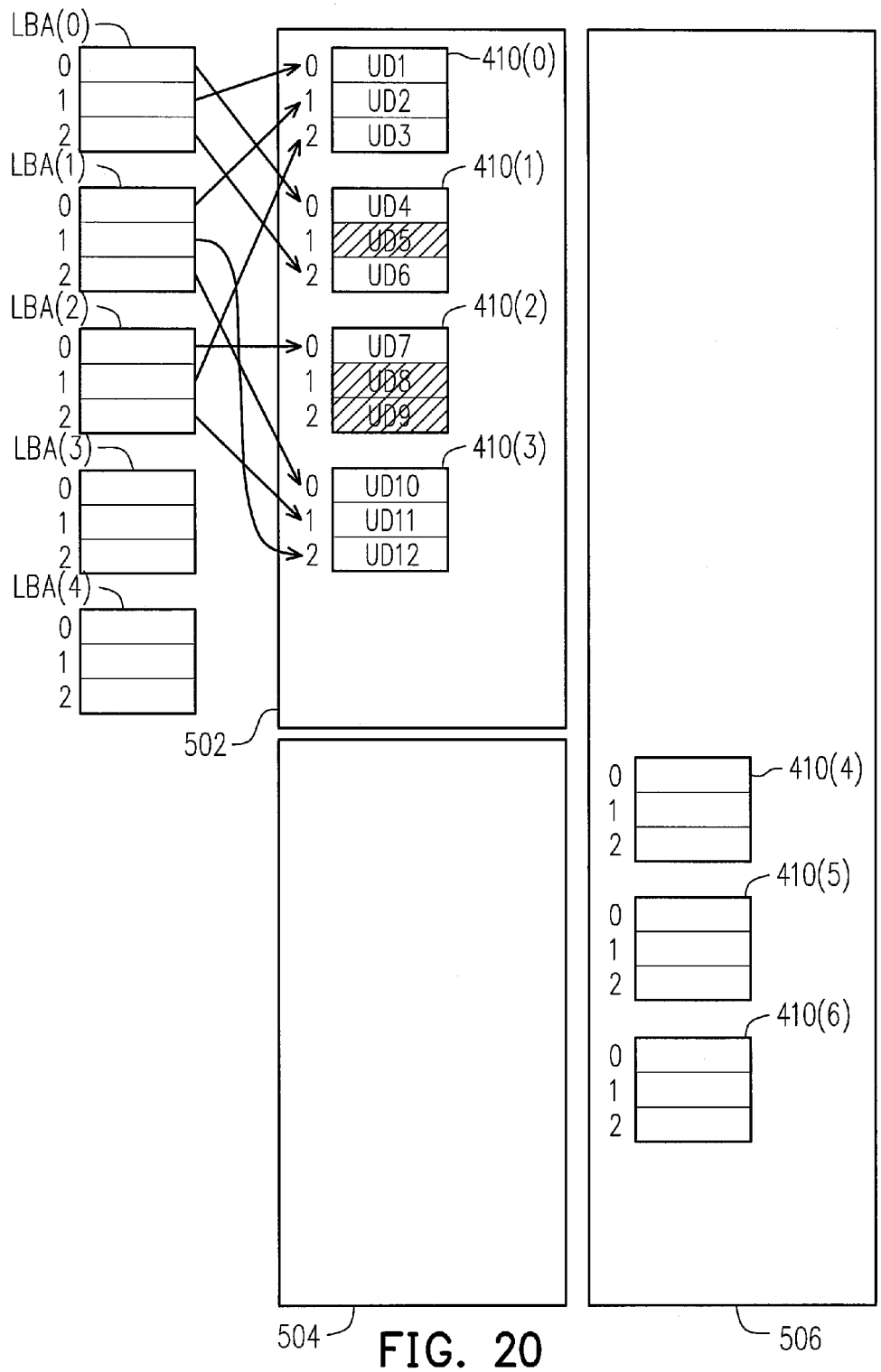

Referring to FIG. 20 as continuation of FIG. 19, it is assumed that data UD12 is to be further programmed and the data UD12 belongs to a first logical page of the logical unit LBA(1), the memory control circuit unit 104 (or the memory management circuit 202) may issue a programming command to write the data UD12 into a second physical programming unit of the physical erasing unit 410(3). Therein, the first physical programming unit of the physical erasing unit 410(1) is marked as invalid (as shown by a dash line). In addition, the memory control circuit unit 104 (or the memory management circuit 202) records that the first logical page of the logical unit LBA(1) is mapped to the second physical programming unit of the physical erasing unit 410(3) in the logical-to-physical address mapping table.

Accordingly, regardless whether the host system 1000 intends to store the data into the logical pages of which logical unit, the memory control circuit unit 104 (or the memory management circuit 202) may sequentially write the data to be stored by the host system 1000 into the current used physical erasing unit. Particularly, if the number of the physical erasing units of the spare area 506 is not greater than the garbage collecting threshold, the memory control circuit unit 104 (or the memory management circuit 202) may execute the data merging operation while executing the write command, so as to prevent the physical erasing units of the spare area from being used up. Or, the memory control circuit unit 104 (or the memory management circuit 202) may execute the data merging operation at the background after the write/read command is not received within a period of time, but a timing for executing the data merging operation is not particularly limited in the present invention.

Figure 21:
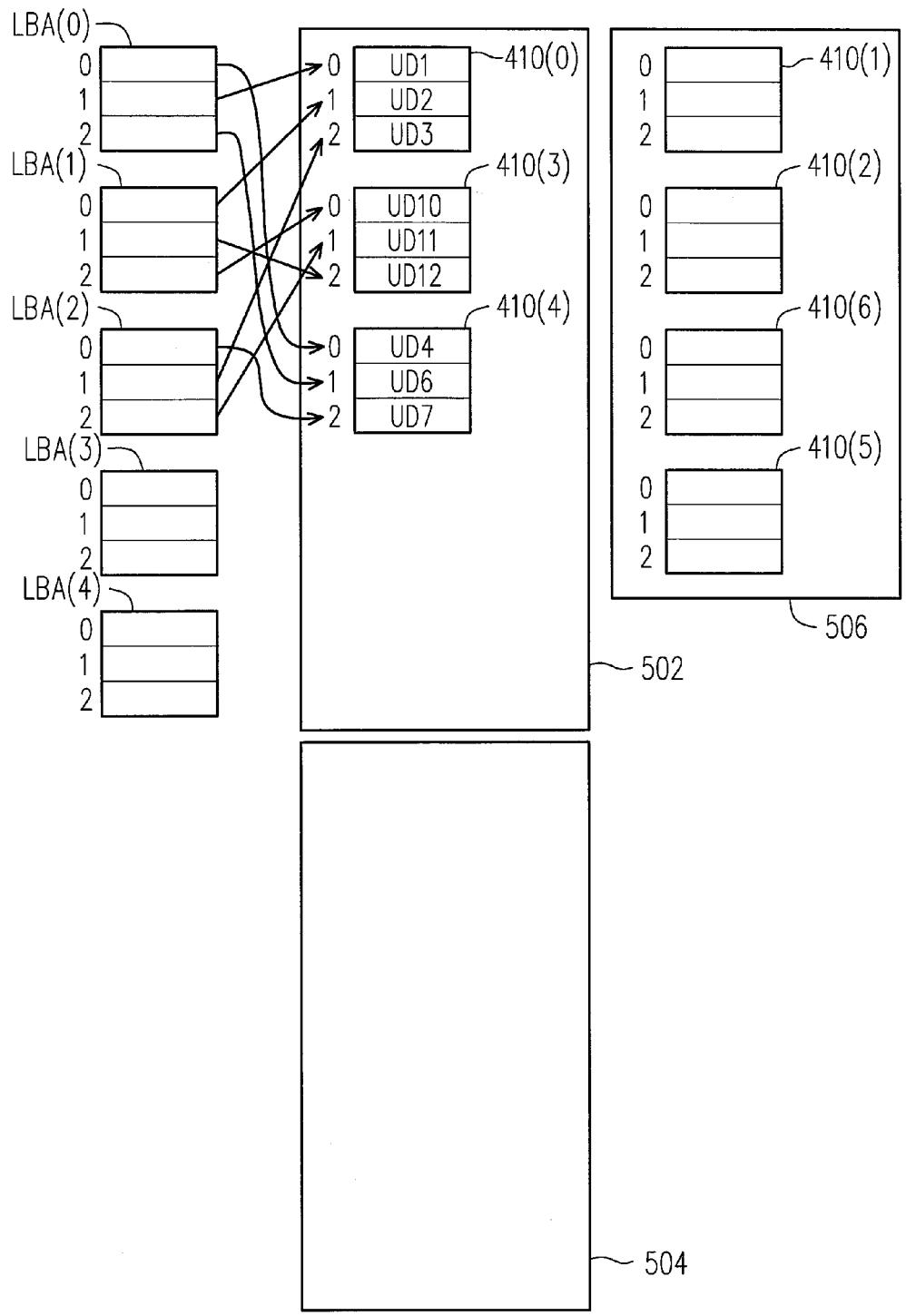
FIGS. 21 and 22 illustrate a simplified example of executing a valid data merging procedure for completing subsequent write command.
Figure 22:
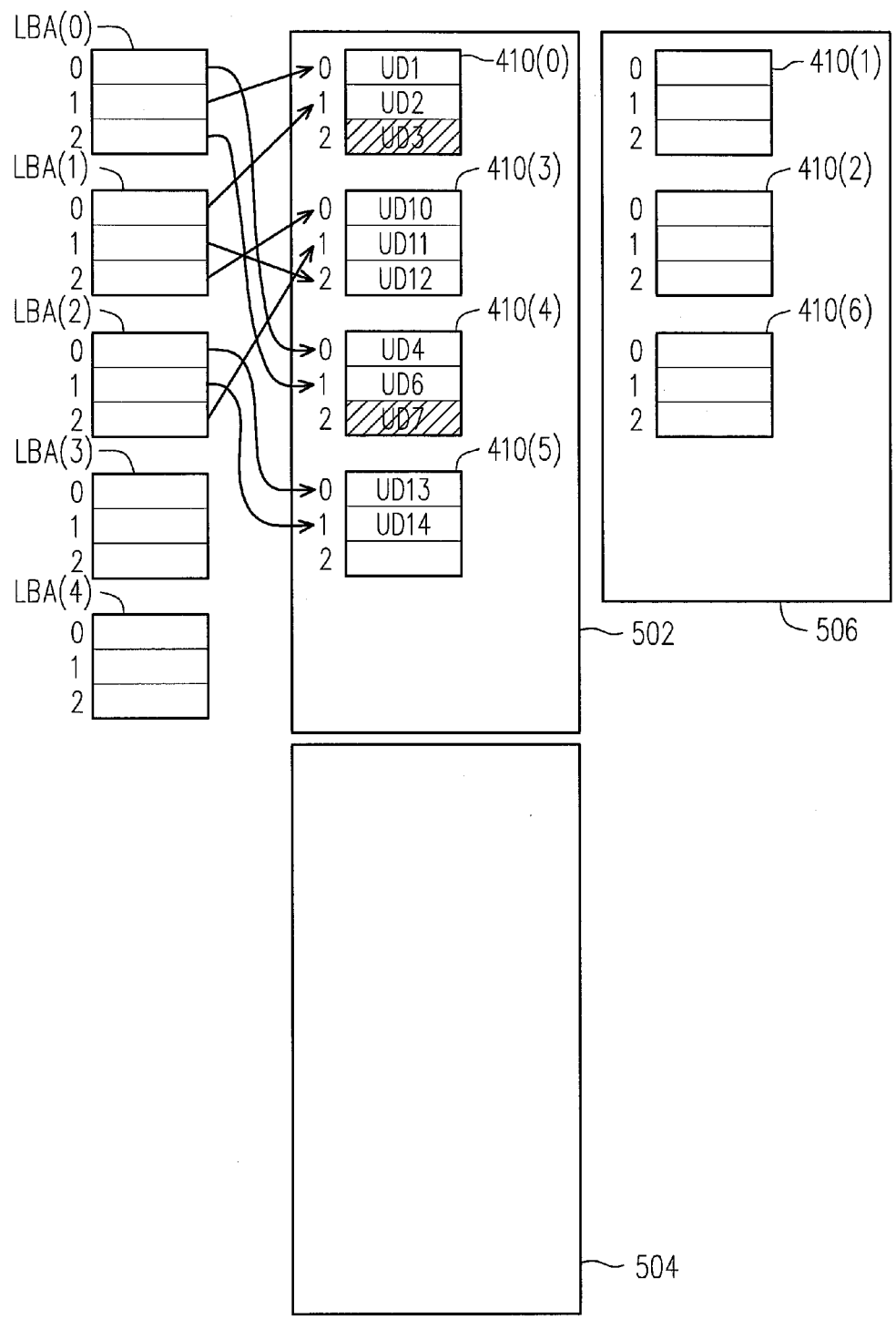

FIGS. 21 and 22 illustrate a simplified example of executing a valid data merging procedure for completing subsequent write command.

As continuation of FIG. 20, it is assumed that data UD13 and UD14 are to be further programmed and the data UD13 and UD14 belong to zeroth and first logical pages of the logical unit LBA(2), but the physical erasing unit 410(3) is out of storage spaces. Therefore, the memory control circuit unit 104 (or the memory management circuit 202) needs to get the empty physical erasing unit from the spare area 504. However, in this case, the number of the physical erasing units of the spare area 504 is not greater than the garbage collecting threshold. Therefore, the memory control circuit unit 104 (or the memory management circuit 202) needs to execute the data merging operation first.

Referring to FIG. 21, for instance, the memory control circuit unit 104 (or the memory management circuit 202) gets the physical erasing unit 410(4) from the spare area 504; copies the valid data (i.e., the data UD4 and UD6) in the physical erasing unit 410(1) and the valid data (i.e., the data UD7) in the physical erasing unit 410(2) to the physical erasing unit 410(4); associates the physical erasing unit 410(4) with the data area 502; marks the zeroth and first physical programming units of the physical erasing unit 410(1) and the zeroth physical programming unit of the physical erasing unit 410(2) as invalid; executes a physical erasing operation to the physical erasing units only stored with the invalid data (i.e., the physical erasing unit 410(1) and the physical erasing unit 410(2)); and associates the erased physical erasing units back with the spare area 504. At this time, the number of the physical erasing units of the spare area 504 is restored back to 4 (i.e., greater than the garbage collecting threshold).

Referring to FIG. 22, thereafter, the memory control circuit unit 104 (or the memory management circuit 202) may get the physical erasing unit 410(5) from the spare area 504, issue a programming command to write the data UD13 and UD14 into zeroth and first physical programming units of the physical erasing unit 410(5), and associate the physical erasing unit 410(5) with the data area 502. Therein, the physical programming units originally mapped to the zeroth and first logical pages of the logical unit LBA(2) (i.e., the second physical programming unit of the physical erasing unit 410(0) and the second physical programming unit of the physical erasing unit 410(4)) are marked as the invalid data.

As described above, in the present exemplary embodiment, a predetermined number of physical erasing units in the rewritable non-volatile memory module are reserved dedicating to write the data to be stored by the host system 100 to the backup logical unit. Accordingly, the memory control circuit unit 104 (or the memory management circuit 202) may dynamically adjust the garbage collecting threshold according to an amount of the backup data being written.

Figure 23:
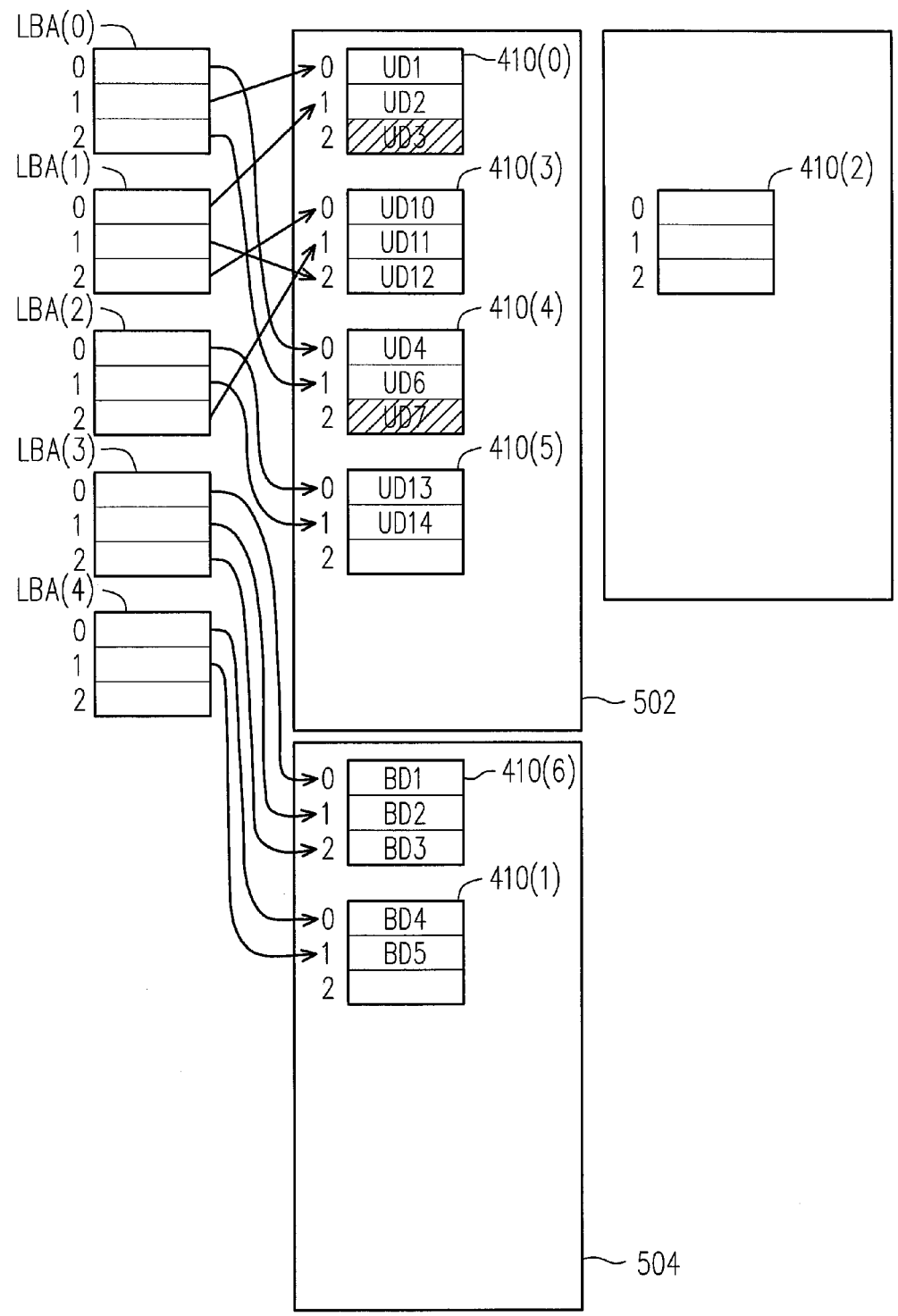
FIG. 23 illustrates an example of writing a backup data according to an exemplary embodiment.

FIG. 23 illustrates an example of writing a backup data according to an exemplary embodiment.

Referring to FIG. 23 as continue to FIG. 22, it is assumed that the power of the host system 1000 malfunctioned so that a write command is issued, which instructs to write the data in the random access memory 1104 (hereinafter, backup data BD1 to BD5) into zeroth to second logical pages of the logical unit LBA(3) and zeroth to first logical pages of the logical unit LBA(4) in the memory storage apparatus 100. Since two of the physical erasing units are reserved in the spare area 506 dedicating to write the data to be stored into the logical unit LBA(3) and the logical unit LBA(4), the memory control circuit unit 104 (or the memory management circuit 202) may get the empty physical erasing units (i.e., the physical erasing units 410(6) and 410(1)) from the spare area 506, issue a programming command to write the backup data BD1 to BD5 sequentially into the physical erasing units 410(6) and 410(1), and associate the physical erasing units 410(6) and 410(1) with the backup area 504.

Further, because the physical erasing units dedicating to the spare area are already used, the memory control circuit unit 104 (or the memory management circuit 202) may adjust the garbage collecting threshold accordingly. More specifically, the memory control circuit unit 104 (or the memory management circuit 202) records a number of the physical erasing units in the backup area 504, and sets an initial garbage collecting threshold (i.e., the value obtained by summing the minimum threshold and the predetermined number) minus the number of physical erasing units of the backup area 504 as a new garbage collecting threshold (i.e., the adjust garbage collecting threshold). In the example of FIG. 23, the new garbage collecting threshold is set to 1.

In the example of FIG. 23, although the host system 1000 instructs to write a great amount of data at once, a time for executing the write command may still be effectively reduced since the memory control circuit unit 104 (or the memory management circuit 202) does not need to make room for executing the data merging operation. In addition, the data is written into the physical erasing units of the backup area 504 in sequence. Therefore, when the host system 1000 is restarted after a power outage, the backup data may be quickly read from the physical erasing units of the backup area 504, so that a recovery operation may be effectively completed.

In addition, the memory control circuit unit 104 (or the memory management circuit 202) only reserves the predetermined number of the physical erasing units for storing the data to be stored to the backup logical unit. Therefore, during operations of the memory storage apparatus 100, the number of the physical erasing units of the backup area 504 will not exceed the predetermined number. For instance, in an exemplary embodiment, after the host system 1000 is restarted and the recovery operation is completed (e.g., recovering the data in the physical erasing units of the backup area 504 back to the random access memory 1104), the memory control circuit unit 104 (or the memory management circuit 202) may also execute an erasing operation to the physical erasing units of the backup area 504 (e.g., the physical erasing units 410(6) and 410(1)), and associate the erased physical erasing units 410(6) and 410(1) back with the spare area 506. Accordingly, the spare area 506 may still include two physical erasing units for storing the data to be stored to the backup logical unit again. In this case, the memory control circuit unit 104 (or the memory management circuit 202) may adjust the garbage collecting threshold according to the number of physical erasing units in the backup area 504 and the minimum threshold again. For instance, after the physical erasing units 410(6) and 410(0) are associated back with the spare area 506, the memory control circuit unit 104 (or the memory management circuit 202) may re-set the garbage collecting threshold to 3.

Furthermore, in another exemplary embodiment, after the host system 1000 is restarted and the recovery operation is completed (e.g., recovering the data in the physical erasing units of the backup area 504 back to the random access memory 1104), the host system 1000 may also issue a delete command which instructs to erase a part or all of the data in the backup area 504. This backup delete command is, for example, a trim command. In this case, the memory control circuit unit 104 (or the memory management circuit 202) may also execute the erasing operation to the physical erasing units in the backup area 504 which are not stored with the valid data, and associate the erased physical erasing units back with the spare area 506. Similarly, the memory control circuit unit 104 (or the memory management circuit 202) may adjust the garbage collecting threshold according to the number of physical erasing units in the backup area 504 and the minimum threshold again. For instance, assuming that the physical erasing unit 410(6) is no longer stored with the valid data after one specific part of the backup data is erased according to the erase command of the host system 1000, the memory control circuit unit 104 (or the memory management circuit 202) may execute the erasing operation to the physical erasing unit 410(6), associate the erased physical erasing unit 410(6) back with the spare area, and re-set the garbage collecting threshold to 2.

In view of above examples, it can be known that, the memory control circuit unit 104 (or the memory management circuit 202) according to the present exemplary embodiment may dynamically reserve a predetermined number of physical erasing units in the rewritable non-volatile memory module 106 dedicating to write the data to be stored to the backup logical unit by adjusting the garbage collecting threshold, such that the memory storage apparatus 100 with the page-based management may still effectively write the data quickly even when the great amount of data needs to be backed up due to a power malfunction of the host system 1000, so as to prevent the data from losing.

It should be noted that, in above embodiments, the host system 1000 stores the backup data to the logical units LBA(3) to LBA(4) which are arranged to be mapped to the physical erasing units associated with the backup area 504 when the power malfunction occurs. However, the invention is not limited thereto. In another exemplary embodiment, the host system 1000 may also store a common user data (including a random user data or sequential user data) into the logical units mapped to the physical erasing units of the backup area 504, and the memory control circuit unit 104 (or the memory management circuit 202) may also adjust the garbage collecting threshold according to the number of physical erasing units associated with the backup area 504.

Figure 24:
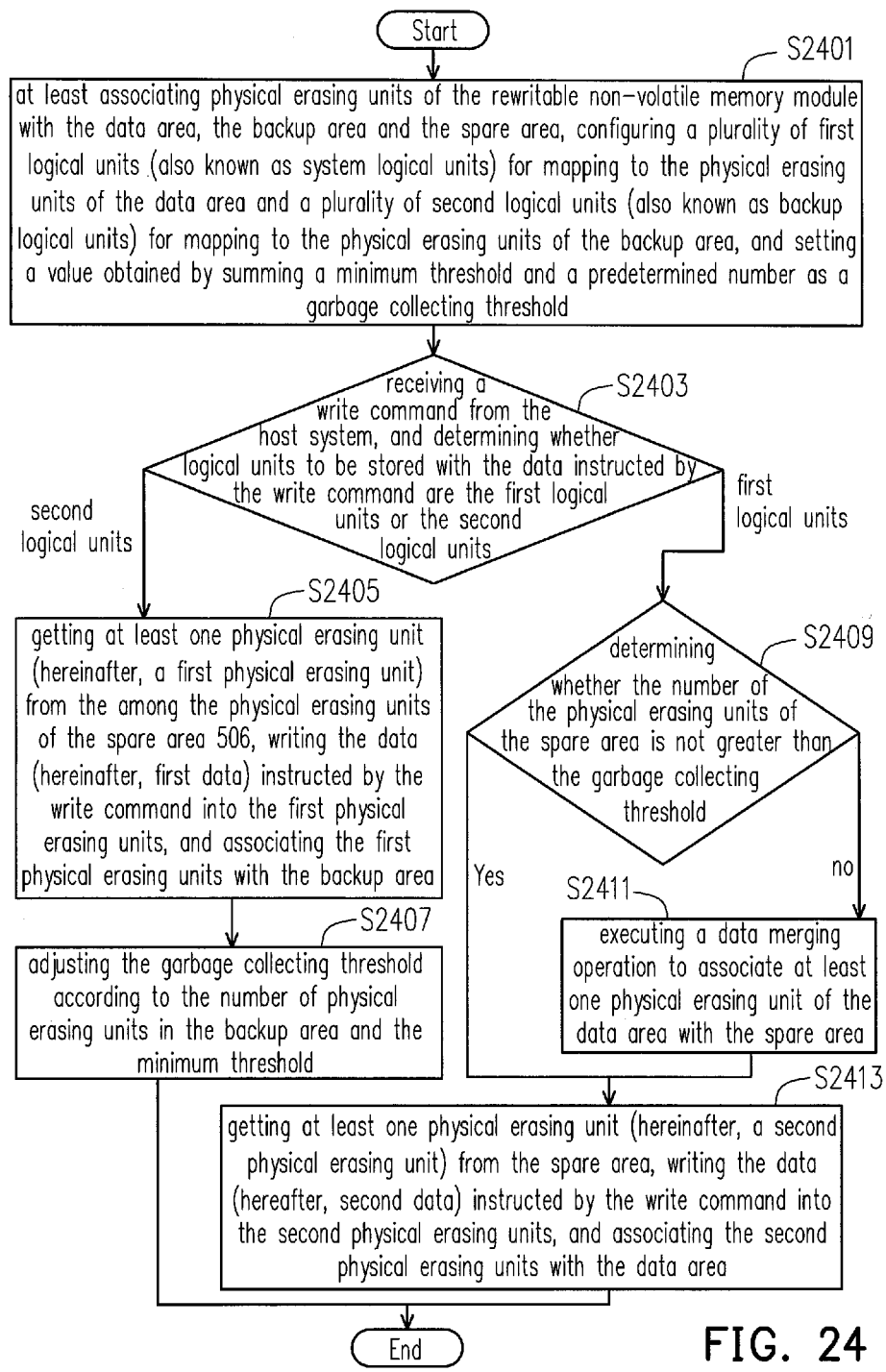
FIG. 24 is a flowchart of a data writing method according to an exemplary embodiment.

FIG. 24 is a flowchart of a data writing method according to an exemplary embodiment of the invention.

Referring to FIG. 24, in steps S2401, the memory control circuit unit 104 (or the memory management circuit 202) at least associates physical erasing units of the rewritable non-volatile memory module 106 with the data area 502, the backup area 504 and the spare area 506, disposes a plurality of first logical units (also known as system logical units) to be mapped to the physical erasing units of the data area 502 and a plurality of second logical units (also known as backup logical units) to be mapped to the physical erasing units of the backup area 504, and sets a value obtained by summing a minimum threshold and a predetermined number as a garbage collecting threshold. As described above, the minimum threshold is the number of physical erasing units required for the data merging procedure, and the predetermined number is the number of the physical erasing units reserved dedicating to write the backup data. Herein, the minimum threshold and the predetermined number may be any number set by the user based on requirements.

In step S2403, the memory control circuit unit 104 (or the memory management circuit 202) receives a write command from the host system 100, and determines whether logical units to be stored with the data instructed by the write command are the first logical units or the second logical units.

If the logical units to be stored with the data instructed by the write command are the second logical units, in step S2405, the memory control circuit unit 104 (or the memory management circuit 202) gets at least one physical erasing unit (hereinafter, a first physical erasing unit) from among the physical erasing units of the spare area 506, writes the data (hereinafter, first data) instructed by the write command into the first physical erasing units, and associates the first physical erasing units with the backup area 504. Further, in step S2407, the memory control circuit unit 104 (or the memory management circuit 202) adjusts the garbage collecting threshold according to the number of physical erasing units in the backup area 504 and the minimum threshold.

If the logical units to be stored with the data instructed by the write command are the first logical units, in step S2409, the memory control circuit unit 104 (or the memory management circuit 202) determines whether a number of the physical erasing units of the spare area 506 is not greater than the garbage collecting threshold.

If the number of the physical erasing units of the spare area 506 is not greater than the garbage collecting threshold, in step S2411, the memory control circuit unit 104 (or the memory management circuit 202) executes a data merging operation to associate at least one physical erasing unit of the data area 502 with the spare area 506. For instance, the memory control circuit unit 104 (or the memory management circuit 202) selects one physical erasing unit (hereinafter, a third physical erasing unit) from among the physical erasing units of the data area 502; if at least one valid data is existed in the third physical erasing unit, copies the at least one valid data from the third physical erasing unit to another physical erasing unit (hereinafter, a fourth physical erasing unit) of the data area 502; erases the third physical erasing unit; and associates the erased third physical erasing unit with the spare area 506. The method of the data merging operation are described in detail as above with reference to the drawings, thus it is omitted hereinafter.

Thereafter, in step S2413, the memory control circuit unit 104 (or the memory management circuit 202) gets at least one physical erasing unit (hereinafter, a second physical erasing unit) from the spare area 506, writes the data (hereafter, second data) instructed by the write command into the second physical erasing units, and associates the second physical erasing units with the data area 506.

Based on above, the data writing method, the memory control circuit unit and the memory storage apparatus according to the embodiments of the invention are capable of effectively programming the data with the page-based writing mechanism as well as effectively writing a great amount of backup data. As a result, the time for executing the write command for the great amount of backup data may be reduced, and loss of the data may also be prevented.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method for a rewritable non-volatile memory module having a plurality of physical erasing units, and the data writing method comprising:
    associating the physical erasing units with a data area, a backup area or a spare area;
    configuring a plurality of first logical units and a plurality of second logical units for being accessed by a host system, wherein the first logical units are mapped to physical erasing units associated with the data area, and second logical units are mapped to the physical erasing units associated with the backup area;
    setting a value obtained by summing a minimum threshold and a predetermined number as a garbage collecting threshold, wherein the minimum threshold is the number of physical erasing units required for a data merging operation, and the predetermined number is the number of physical erasing units reserved dedicating to write backup data;
    receiving a first write command from the host system, wherein the first write command instructs to write first data into at least one logical unit among the second logical units; and
    getting at least one first physical erasing unit from among the physical erasing units of the spare area, writing the first data into the at least one first physical erasing unit, associating the at least one first physical erasing unit with the backup area, and adjusting the garbage collecting threshold according to a number of the at least one first physical erasing unit and the minimum threshold,
    wherein the adjusted garbage collecting threshold is obtained by subtracting the number of the physical erasing units associated with the backup area among the physical erasing units from the value obtained by summing the minimum threshold and the predetermined number, and the number of the physical erasing units associated with the backup area among the physical erasing units is not greater than the predetermined number.

2. The data writing method of claim 1, further comprising:
    receiving a second write command from the host system, wherein the second write command instructs to write second data into at least one logical unit among the first logical units; and getting at least one second physical erasing unit from among the physical erasing units of the spare area, writing the second data into the at least one second physical erasing unit, and associating the at least one second physical erasing unit with the data area.

3. The data writing method of claim 2, further comprising:

determining whether the number of the physical erasing units of the spare area is not greater than the garbage collecting threshold; and if the number of the physical erasing units of the spare area is not greater than the garbage collecting threshold, executing the data merging operation to associate at least one physical erasing unit of the data area with the spare area.

4. The data writing method of claim 3, wherein the step of executing the data merging operation to associate the at least one physical erasing unit of the data area with the spare area comprises:

selecting a third physical erasing unit form among the physical erasing units of the data area;

if at least one valid data is existed in the third physical erasing unit, copying the at least one valid data from the third physical erasing unit to a fourth physical erasing unit in the data area; and erasing the third physical erasing unit, and associating the erased third physical erasing unit with the spare area.

5. The data writing method of claim 1, further comprising:

receiving a delete command from the host system, wherein the delete command instructs to delete the first data; and executing an erasing operation to the at least one first physical erasing unit, associating the at least one first physical erasing unit with the spare area, and re-adjusting the garbage collecting threshold according to the minimum threshold and the number of the physical erasing units associated with the backup area among the physical erasing units.

6. A memory storage apparatus, comprising:

a connection interface unit configured to couple to a host system;

a rewritable non-volatile memory module having a plurality of physical erasing units; and a memory control circuit unit coupled to the connection interface unit and the rewritable non-volatile memory module, wherein the memory control circuit unit is configured to associate the physical erasing units with a data area, a backup area or a spare area, wherein the memory control circuit unit is further configured to configure a plurality of first logical units and a plurality of second logical units for being accessed by the host system, wherein the first logical units are mapped to physical erasing units associated with the data area, and the second logical units are mapped to physical erasing units associated with the backup area, wherein the memory control circuit unit is further configured to set a value obtained by summing a minimum threshold and a predetermined number as a garbage collecting threshold, the minimum threshold is the number of physical erasing units required for a data merging operation, and the predetermined number is the number of physical erasing units reserved dedicating to write backup data, wherein the memory control circuit unit is further configured to receive a first write command from the host system, wherein the first write command instructs to write first data into at least one logical unit among the second logical units, wherein the memory control circuit unit is further configured to get at least one first physical erasing unit from among the physical erasing units of the spare area, write the first data into the at least one first physical erasing unit, associate the at least one first physical erasing unit with the backup area, and adjust the garbage collecting threshold according to a number of the at least one first physical erasing unit and the minimum threshold, wherein the adjusted garbage collecting threshold is obtained by subtracting the number of the physical erasing units associated with the backup area among the physical erasing units from the value obtained by summing the minimum threshold and the predetermined number, and the number of the physical erasing units associated with the backup area among the physical erasing units is not greater than the predetermined number.

7. The memory storage apparatus of claim 6, wherein the memory control circuit unit is further configured to receive a second write command from the host system, wherein the second write command instructs to write second data into at least one logical unit among the first logical units, wherein the memory control circuit unit is further configured to get at least one second physical erasing unit from among the physical erasing units of the spare area, write the second data into the at least one second physical erasing unit, and associate the at least one second physical erasing unit with the data area.

8. The memory storage apparatus of claim 7, wherein the memory control circuit unit is further configured to determine whether the number of the physical erasing units of the spare area is not greater than the garbage collecting threshold, if the number of the physical erasing units of the spare area is not greater than the garbage collecting threshold, the memory control circuit unit executes the data merging operation to associate at least one physical erasing unit of the data area with the spare area.

9. The memory storage apparatus of claim 8, wherein in the operation of executing the data merging operation to associate the at least one physical erasing unit of the data area with the spare area, the memory control circuit unit selects a third physical erasing unit form among the physical erasing units of the data area, erases the third physical erasing unit, and associates the erased third physical erasing unit with the spare area, wherein if at least one valid data is existed in the third physical erasing unit, the memory control circuit unit copies the at least one valid data from the third physical erasing unit to a fourth physical erasing unit in the data area before erasing the third physical erasing units.

10. The memory storage apparatus of claim 6, wherein the memory control circuit unit is further configured to receive a delete command from the host system, wherein the delete command instructs to delete the first data, wherein the memory control circuit unit is further configured to execute an erasing operation to the at least one first physical erasing unit, associate the at least one first physical erasing unit with the spare area, and re-adjust the garbage collecting threshold according to the minimum threshold and the number of the physical erasing units associated with the backup area among the physical erasing units.

11. A memory control circuit unit, for controlling a rewritable non-volatile memory module, and the memory control circuit unit comprising:

a host interface configured to couple to a host system;

a memory interface configured to couple to the rewritable non-volatile memory module, wherein the rewritable non-volatile memory module has a plurality of physical erasing units; and a memory management circuit coupled to the host interface and the memory interface, wherein the memory management circuit is configured to associate the physical erasing units with a data area, a backup area or a spare area, wherein the memory management circuit is further configured to configure a plurality of first logical units and a plurality of second logical units for being accessed by the host system, wherein the first logical units are mapped to physical erasing units associated with the data area, and the second logical units are mapped to physical erasing units associated with the backup area, wherein the memory management circuit is further configured to set a value obtained by summing a minimum threshold and a predetermined number as a garbage collecting threshold, the minimum threshold is the number of physical erasing units required for a data merging operation, and the predetermined number is the number of physical erasing units reserved dedicating to write backup data, wherein the memory management circuit is further configured to receive a first write command from the host system, wherein the first write command instructs to write first data into at least one logical unit among the second logical units, wherein the memory management circuit is further configured to get at least one first physical erasing unit from among the physical erasing units of the spare area, write the first data into the at least one first physical erasing unit, associate the at least one first physical erasing unit with the backup area, and adjust the garbage collecting threshold according to a number of the at least one first physical erasing unit and the minimum threshold, wherein the adjusted garbage collecting threshold is obtained by subtracting the number of the physical erasing units associated with the backup area among the physical erasing units from the value obtained by summing the minimum threshold and the predetermined number, and the number of the physical erasing units associated with the backup area among the physical erasing units is not greater than the predetermined number.

12. The memory control circuit unit of claim 11, wherein the memory management circuit is further configured to receive a second write command from the host system, wherein the second write command instructs to write second data into at least one logical unit among the first logical units, wherein the memory management circuit is further configured to get at least one second physical erasing unit from among the physical erasing units of the spare area, write the second data into the at least one second physical erasing unit, and associate the at least one second physical erasing unit with the data area.

13. The memory control circuit unit of claim 12, wherein the memory management circuit is further configured to determine whether the number of the physical erasing units of the spare area is not greater than the garbage collecting threshold, if the number of the physical erasing units of the spare area is not greater than the garbage collecting threshold, the memory management circuit executes the data merging operation to associate at least one physical erasing unit of the data area with the spare area.

14. The memory control circuit unit of claim 13, wherein in the operation of executing the data merging operation to associate the at least one physical erasing unit of the data area with the spare area, the memory management circuit selects a third physical erasing unit form among the physical erasing units of the data area, erases the third physical erasing unit, and associates the erased third physical erasing unit with the spare area, wherein if at least one valid data is existed in the third physical erasing unit, the memory management circuit copies the at least one valid data from the third physical erasing unit to a fourth physical erasing unit in the data area before erasing the third physical erasing units.

15. The memory control circuit unit of claim 11, wherein the memory management circuit is further configured to receive a delete command from the host system, wherein the delete command instructs to delete the first data, wherein the memory management circuit is further configured to execute an erasing operation to the at least one first physical erasing unit, associate the at least one first physical erasing unit with the spare area, and re-adjust the garbage collecting threshold according to the minimum threshold and the number of the physical erasing units associated with the backup area among the physical erasing units.

* * * * *